(12) United States Patent
Kato et al.

(10) Patent No.: US 9,683,530 B2
(45) Date of Patent: Jun. 20, 2017

(54) AIR INTAKE APPARATUS AND MANUFACTURING METHOD OF AIR INTAKE APPARATUS

(71) Applicant: AISIN SEIKI KABUSHIKI KAISHA, Kariya-shi, Aichi-ken (JP)

(72) Inventors: Takuya Kato, Nagoya (JP); Motonobu Hasegawa, Kariya (JP); Masato Ishii, Kariya (JP); Tomoyuki Hirabayashi, Ichinomiya (JP); Kazuya Kondo, Anjo (JP); Yuta Tanaka, Chiryu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 181 days.

(21) Appl. No.: 14/660,190

(22) Filed: Mar. 17, 2015

(65) Prior Publication Data

US 2015/0267654 A1    Sep. 24, 2015

(30) Foreign Application Priority Data

Mar. 18, 2014  (JP) .................................. 2014-054738

(51) Int. Cl.
*F02M 35/10* (2006.01)
*B23K 20/10* (2006.01)
(Continued)

(52) U.S. Cl.
CPC ....... *F02M 35/10354* (2013.01); *B23K 20/10* (2013.01); *B23K 20/22* (2013.01);
(Continued)

(58) Field of Classification Search
CPC ......... F02M 35/10354; F02M 35/1036; F02M 35/116; F02M 25/10321; F02M 35/10065;
(Continued)

(56) References Cited

U.S. PATENT DOCUMENTS

2004/0123826 A1* 7/2004 Yamamoto .............. F02B 27/02
123/184.44
2009/0133658 A1* 5/2009 Fukuda ............ F02M 35/10052
123/184.61

(Continued)

FOREIGN PATENT DOCUMENTS

JP  2008-144768 A  6/2008

*Primary Examiner* — Marguerite McMahon
(74) *Attorney, Agent, or Firm* — Buchanan Ingersoll & Rooney PC

(57) ABSTRACT

An air intake apparatus includes an air intake apparatus body including a surge tank, a valve body rotatably attached to the surge tank and configured to rotate between an open position and a closed position to open and close a fluid passage formed at a partition wall dividing an inside of the surge tank into two parts, the valve body being out of contact with the partition wall at the open position and being in contact with the partition wall at the closed position, the air intake apparatus body being formed by a first member to which the valve body is attached and a second member joined to each other, and the first member including a jig-receiving portion arranged in a vicinity of the fluid passage and configured to receive a jig holding the first member when the first member and the second member are being joined to each other.

5 Claims, 13 Drawing Sheets

(51) Int. Cl.
 *B23K 20/22* (2006.01)
 *F02B 27/00* (2006.01)
 *F02M 35/116* (2006.01)
 *F02B 27/02* (2006.01)
 *B23K 101/00* (2006.01)
 *B23K 101/04* (2006.01)

(52) U.S. Cl.
 CPC ........ *F02B 27/008* (2013.01); *F02B 27/0273* (2013.01); *F02M 35/1036* (2013.01); *F02M 35/10065* (2013.01); *F02M 35/10321* (2013.01); *F02M 35/116* (2013.01); *B23K 2201/006* (2013.01); *B23K 2201/04* (2013.01); *Y02T 10/146* (2013.01)

(58) Field of Classification Search
 CPC .... F02B 27/008; F02B 27/0273; B23K 20/10; B23K 20/22; B23K 2201/04; B23K 2201/006; Y02T 10/146
 USPC ........................................ 123/184.21–184.61
 See application file for complete search history.

(56) References Cited

U.S. PATENT DOCUMENTS

| | | | |
|---|---|---|---|
| 2013/0125851 A1* | 5/2013 | Miyashita | ............ F02M 35/104 123/184.21 |
| 2014/0116377 A1 | 5/2014 | Ishii et al. | |

\* cited by examiner

State of valve body at closed position (VIII-VIII cross section)

Support structure of valve body at Y1 direction side

Modification in which concave escape portion is concave upward

AIR INTAKE APPARATUS AND MANUFACTURING METHOD OF AIR INTAKE APPARATUS

CROSS REFERENCE TO RELATED APPLICATIONS

This application is based on and claims priority under 35 U.S.C. §119 to Japanese Patent Application 2014-054738, filed on Mar. 18, 2014, the entire content of which is incorporated herein by reference.

TECHNICAL FIELD

This disclosure generally relates to an air intake apparatus and a manufacturing method of the air intake apparatus.

BACKGROUND DISCUSSION

In general, an air intake control valve including a valve body to open and close a fluid passage is known. Such an air intake control valve is disclosed in, for example, JP2008-144768A, which will be hereinafter referred to as Patent reference 1.

According to a butterfly-valve-type control valve (an air intake control valve) disclosed in Patent reference 1, the air intake control valve includes a frame-shaped body (a frame) formed with an air intake passage (a fluid passage), and a valve (a valve body) supported by the frame-shaped body to rotate between an open position and a closed position to open and close the air intake passage provided at an inner side of the body.

In addition, according to a known configuration of a surge tank for an internal-combustion engine, an inside space portion of the surge tank is divided into two space portions by a partition wall, and the butterfly-valve-type control valve (the air intake control valve) described in Patent reference 1 is provided at an opening portion formed at the partition wall so that a resonance frequency of an air intake system is changed and thus an effective supercharging effect is obtained in a wide engine operation range. In this configuration, the frame-shaped body (the frame) in a state where the valve (the valve body) is attached thereto is fitted into the opening portion penetrating the partition wall of the surge tank-side. In a case where the valve supported by the body rotates to the open position, the two space portions in the surge tank are in fluid communication with each other through the air intake passage (the fluid passage) formed at the inner side of the body. Further, in a case where the valve rotates to the closed position, the air intake passage formed at the inner side of the body is blocked to separate the two space portions from each other.

In the aforementioned known configuration, however, the frame-shaped body is fitted in the opening portion formed at the partition wall and the air intake passage formed at the inner side of the frame-shaped body is opened and closed with the valve. According to this configuration, it is difficult to provide a sufficient cross-sectional area (an opening area) of the air intake passage opened and closed with the valve. In other words, the frame-shaped body is fitted into the opening portion of the partition wall, and accordingly the cross-sectional area of the air intake passage is smaller than an opening area of the opening portion of the partition wall. Therefore, in a case where the valve is opened and the two space portions are in fluid communication with each other, the cross-sectional area of the air intake passage decreases and therefore a pressure loss of the intake air circulating through the air intake passage increases. Consequently, there is such a problem that an amount of the intake air circulating through the air intake passage decreases, and as a result, a sufficient supercharging effect is not obtained.

Thus, a configuration can be considered, in which the valve (the valve body) is attached directly to the surge tank and the opening portion formed at the partition wall of the surge tank is opened and closed by the valve, and accordingly the opening area of the air intake passage when the valve is open is increased.

In the aforementioned configuration where the opening portion (the fluid passage) of the partition wall is opened and closed by the valve (the valve body) attached directly to the surge tank, the surge tank, that is, one surge tank, may be formed in a manner that, for example, plural members including a member to which the valve is mounted are joined to each other by vibration welding. However, the partition wall dividing the internal portion of the surge tank into the two space portions is susceptible to deformation in the process of joining the plural members with each other by the vibration welding. In a case where strain deformation including curvature and/or torsion is generated at a portion (a seal portion) of the partition wall around the valve due to a way of applying load during the vibration welding, the valve (the valve body) is not uniformly or evenly in contact with the seal portion (a seal surface) of the partition wall around the opening portion (the fluid passage) formed at the partition wall. As a result, sealability or a sealing performance decreases.

A need thus exists for an air intake apparatus and a manufacturing method of the air intake apparatus which are not susceptible to the drawback mentioned above.

SUMMARY

According to an aspect of this disclosure, an air intake apparatus includes an air intake apparatus body including a surge tank for an internal combustion engine, a valve body rotatably attached to the surge tank and configured to rotate between an open position and a closed position to open and close a fluid passage formed at a partition wall dividing an inside of the surge tank into two parts, the valve body being out of contact with the partition wall at the open position and being in contact with the partition wall at the closed position, the air intake apparatus body being formed by a first member to which the valve body is attached and a second member joined to each other, and the first member including a jig-receiving portion arranged in a vicinity of the fluid passage and configured to receive a jig holding the first member when the first member and the second member are being joined to each other.

According to another aspect of this disclosure, a manufacturing method of an air intake apparatus, includes a step of attaching a valve body to a first member, the valve body rotating between an open position and a closed position to open and close a fluid passage formed at a partition wall dividing an inside of a surge tank for an internal combustion engine into two parts, the valve body being out of contact with the partition wall at the open position and being in contact with the partition wall at the closed position, a step of forming an air intake apparatus body including the surge tank for the internal combustion engine in a manner that the first member to which the valve body is attached and a second member are joined to each other by vibration welding, and the step of forming the air intake apparatus body including a step of joining the first member and the second member to each other by the vibration welding in a state where a jig-receiving portion arranged in a vicinity of the fluid passage of the first member is held by a jig.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of the present disclosure is now described on the basis of the drawings.

First, the configuration of an air intake apparatus 100 according to the present embodiment is described with reference to FIGS. 1 to 16.

Figure 1:
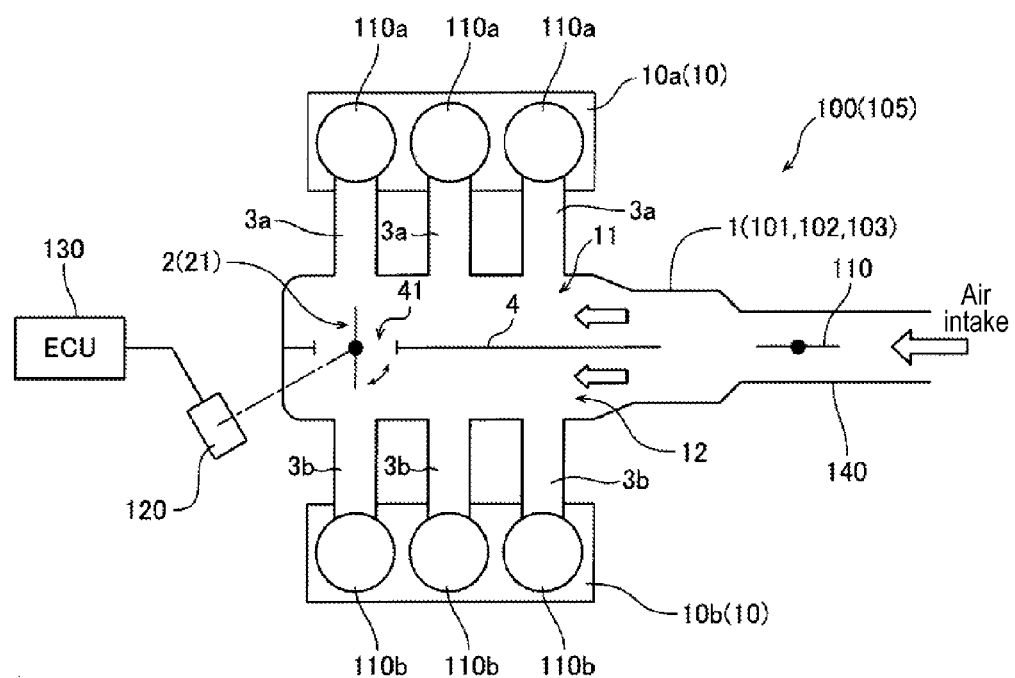
FIG. 1 is a schematic view illustrating an arrangement in an air intake apparatus according to an embodiment disclosed here.
Figure 2:
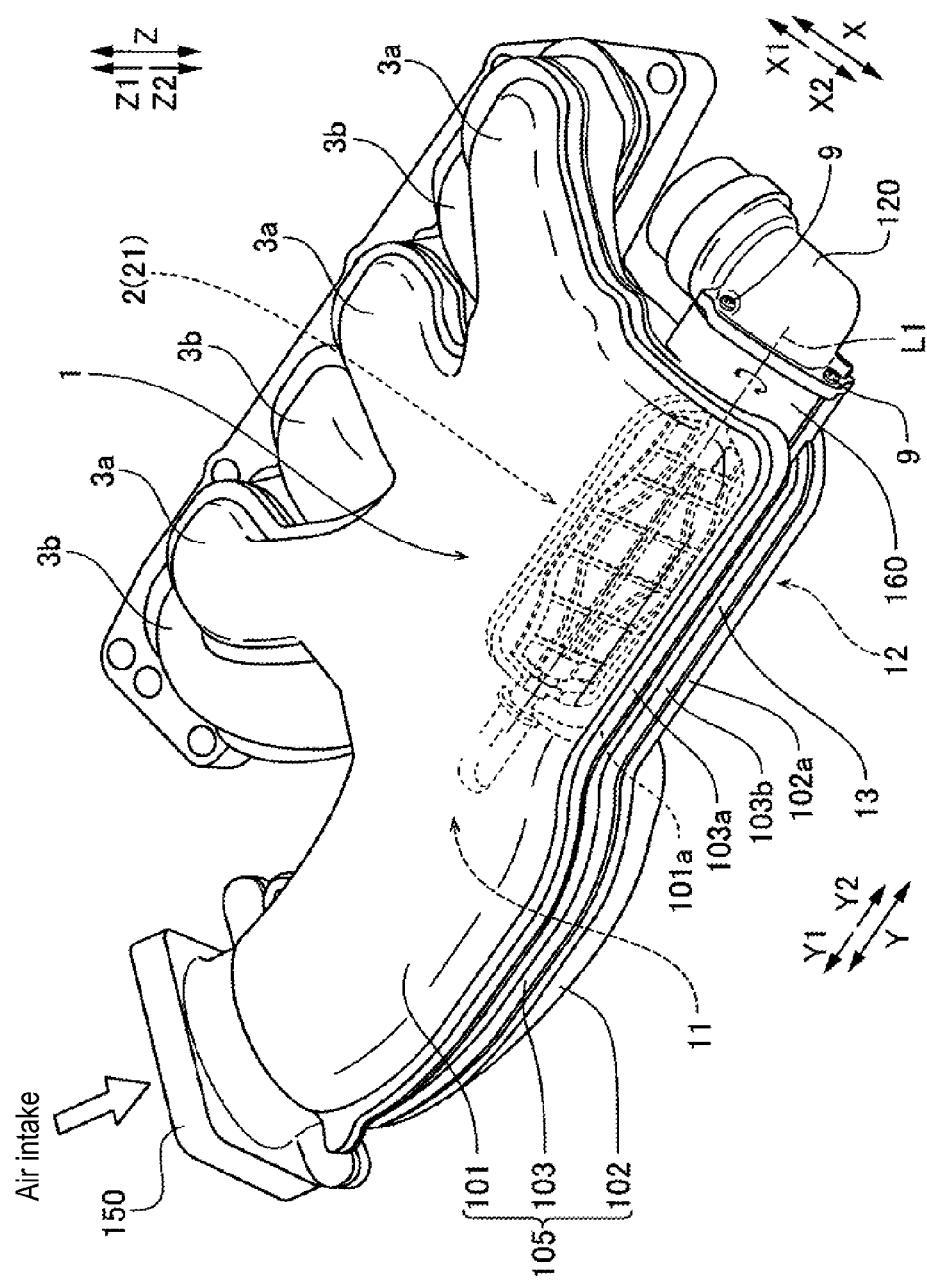
FIG. 2 is a perspective view illustrating a configuration of the air intake apparatus according to the embodiment.

The air intake apparatus 100 according to the present embodiment is an air intake apparatus provided at a V-type 6-cylinder engine 10 for an automobile, as illustrated in FIG. 1. The air intake apparatus 100 includes an air intake apparatus body 105 including a surge tank 1, an air intake control valve 2 provided inside the surge tank 1, and three first air intake ports 3a and three second air intake ports 3b which are arranged at a downstream side of the surge tank 1. Structurally, the air intake apparatus body 105 of the air intake apparatus 100 integrally includes the surge tank 1 and the first and second air intake ports 3a and 3b, as illustrated in FIG. 2. The air intake control valve 2 (refer to FIG. 1) is attached to an internal portion of the air intake apparatus body 105. The V-type 6-cylinder engine 10 is an example of "an internal combustion engine" of the present disclosure.

Intake air flows into the surge tank 1 through an air cleaner and a throttle 110. The surge tank 1 has a partition wall 4 dividing an internal portion of the surge tank 1 into two parts, that is, into a first surge tank region 11 and a second surge tank region 12. The air intake control valve 2 includes a function of opening and closing a fluid passage 41 including an opening portion formed at a part of the partition wall 4. The air intake control valve 2 is configured to open and close the fluid passage 41 by a drive force by an actuator 120. The actuator 120 is configured to be driven on the basis of a signal transmitted from an engine control unit (ECU) 130.

The three first air intake ports 3a respectively connect the first surge tank region 11 arranged at an upper side (a Z1 side) of the partition wall 4 and three cylinders 110a provided in a first bank 10a of the V-type 6-cylinder engine 10 to each other. The three second air intake ports 3b respectively connect the second surge tank region 12 arranged at a lower side (a Z2 side) of the partition wall 4 and three cylinders 110b provided in a second bank 10b of the V-type 6-cylinder engine 10 to each other. The three cylinders 110a of the first bank 10a are a cylinder group including No. 1, No. 3, and No. 5 whose ignition timings are not consecutive, and the three cylinders 110b of the second bank 10b are a cylinder group including No. 2, No. 4, and No. 6 whose ignition timings are not consecutive. Due to the aforementioned configuration, in the air intake apparatus 100 according to the present embodiment, the air intake control valve 2 appropriately opens and closes the fluid passage 41 in response to engine rotation, whereby a resonance frequency of an air intake system can be changed to obtain an effective supercharging effect in a wide engine operation range. The configuration of the air intake apparatus 100 is hereinafter described in more detail.

Figure 3:
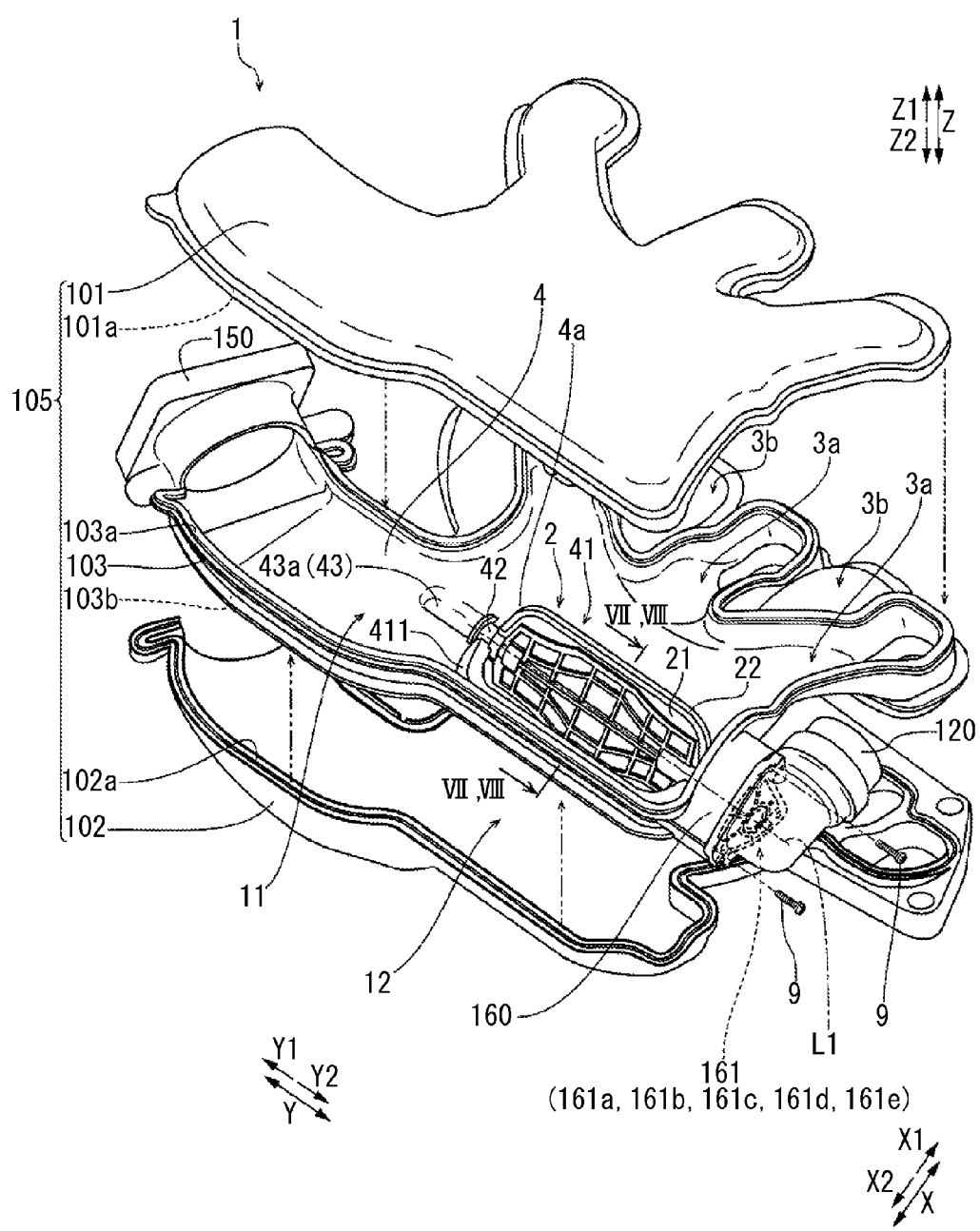
FIG. 3 is an exploded perspective view illustrating the configuration of the air intake apparatus according to the embodiment.

The air intake apparatus body 105 (the surge tank 1) is constituted by an upper piece 101, a lower piece 102, and a middle piece 103 held between the upper piece 101 and the lower piece 102, as illustrated in FIGS. 2 and 3. Each of the upper piece 101, the lower piece 102, and the middle piece 103 is made of resin. The upper piece 101 includes a joint portion 101a and the lower piece 102 includes a joint portion 102a. The middle piece 103 includes a joint portion 103a formed at the Z1 side and a joint portion 103b formed at the Z2 side. The joint portion 101a of the upper piece 101 is formed along a flange-shaped edge portion (which includes a planar outer shape) of the upper piece 101 seamlessly and continuously to include an annular shape. A joint surface (a lower surface at the Z2 side) of the joint portion 101a faces the joint portion 103a of the middle piece 103 at an upper side (the Z1 side). The joint portion 102a of the lower piece 102 is formed along a flange-shaped edge portion (which includes a planar outer shape) of the lower piece 102 seamlessly and continuously to include an annular shape. A joint surface (an upper surface at the Z1 side) of the joint portion 102a faces the joint portion 103b of the middle piece 103 at a lower side (the Z2 side). Each of the joint portions 103a and 103b of the middle piece 103 is formed along a flange-shaped edge portion (which includes a planar outer shape) of the middle piece 103 seamlessly and continuously to include an annular shape. The middle piece 103 serves as an example of "a first member" of the present disclosure. The upper piece 101 and the lower piece 102 serve as an example of "a second member" of the present disclosure.

The joint portions 101a to 103b include a function to connect the upper piece 101, the lower piece 102 and the middle piece 103 with one another, corresponding to an outer configuration of the entire air intake apparatus body 105. Accordingly, corresponding to the configuration of each of the members, each of the joint portions 101a to 103b includes the joint surface formed in the annular shape having planar and steric curve and/or elevation difference (undulation or unevenness). In addition, each of the joint surfaces is formed to include such a configuration that provides a reliable sealing effect to one another.

The upper piece 101, the lower piece 102 and the middle piece 103 are joined (welded) to one another in a manufacturing process or step with the use of vibration welding as will be described later, while the joint portions 101a to 103b keeping a facing or opposing relationship with one another (that is, in a direction Z). Accordingly, the air intake apparatus body 105 corresponding to one integral structure is obtained. The air intake apparatus body 105, that is, the one integral structure, includes the surge tank 1 formed in the internal portion thereof, the first air intake ports 3a, and the second air intake ports 3b which are integrated into the one integral structure. Because the middle piece 103 including the partition wall 4 is interposed between the upper piece 101 and the lower piece 102, the inside of the surge tank 1 is divided into two, that is, the first surge tank region 11 and the second surge tank region 12. The first surge tank region 11 and the second surge tank region 12 are arranged to overlap with each other in an up/down direction (the direction Z). The first surge tank region 11 and the three first air intake ports 3a are constituted or defined by the upper piece 101 and the middle piece 103. The second surge tank region 12 and the three second air intake ports 3b are constituted or defined by the lower piece 102 and the middle piece 103.

The middle piece 103 includes a connection portion 150 and an actuator attach portion 160 each of which is formed to be integral with the middle piece 103. The connection portion 150 is formed at an intake air inflow side (a Y1 side) of the joint portion 103a (the joint portion 103b) to include a flange configuration. The actuator attach portion 160 is positioned in the vicinity of a Y2 side of the fluid passage 41 in which the valve body 21 rotates. An air intake passage 140 (refer to FIG. 1) extended from the side of the throttle 110 (refer to FIG. 1) is connected to the connection portion 150. According to the surge tank 1, a valve body 21 (a rotation shaft 23), which will be described below, of the air intake control valve 2 is supported by the actuator attach portion 160 and a shaft member fixing portion 42 to be rotatable about a rotation shaft line L1. Thicknesses (in the direction Z) of the actuator attach portion 160 and the shaft member fixing portion 42 are greater than thickness of other portion of the surge tank 1, for example, the partition wall 4.

Figure 4:
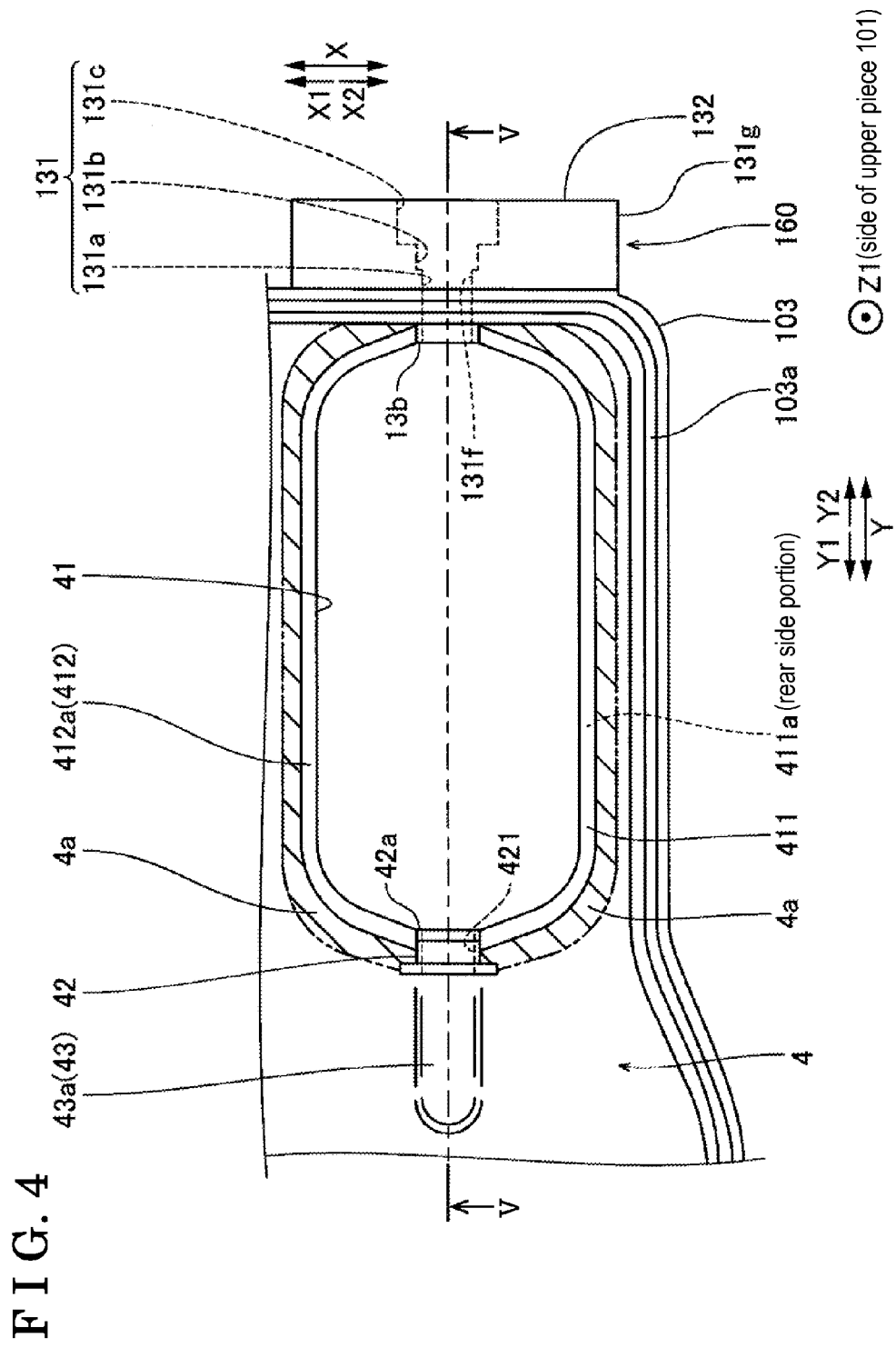
FIG. 4 is a plan view illustrating a fluid passage formed at a partition wall of the air intake apparatus according to the embodiment.
Figure 5:
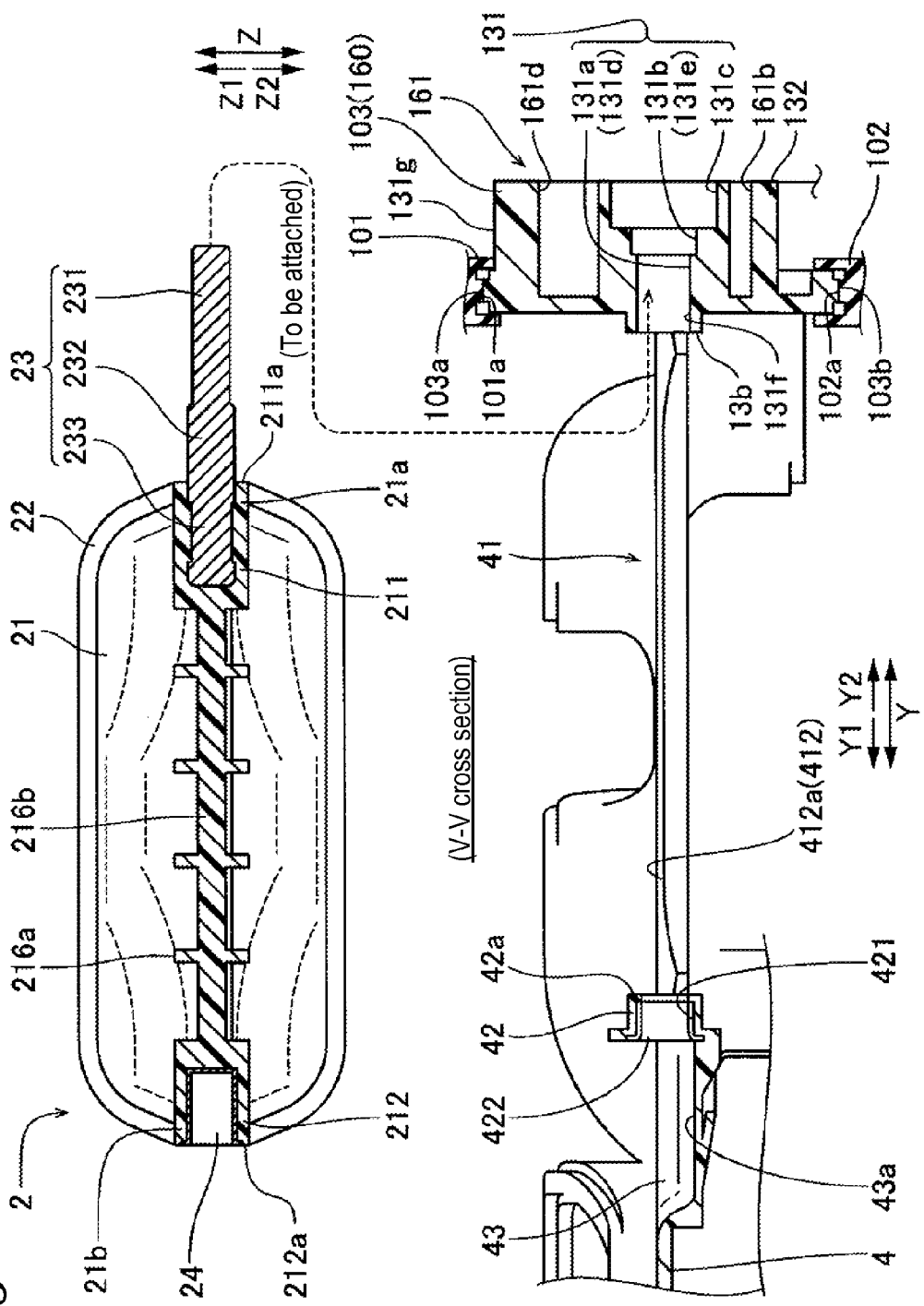
FIG. 5 is a cross-sectional view illustrating the fluid passage and an air intake control valve rotatably provided at the fluid passage, which is taken along the line V-V in FIG. 4.
Figure 6:
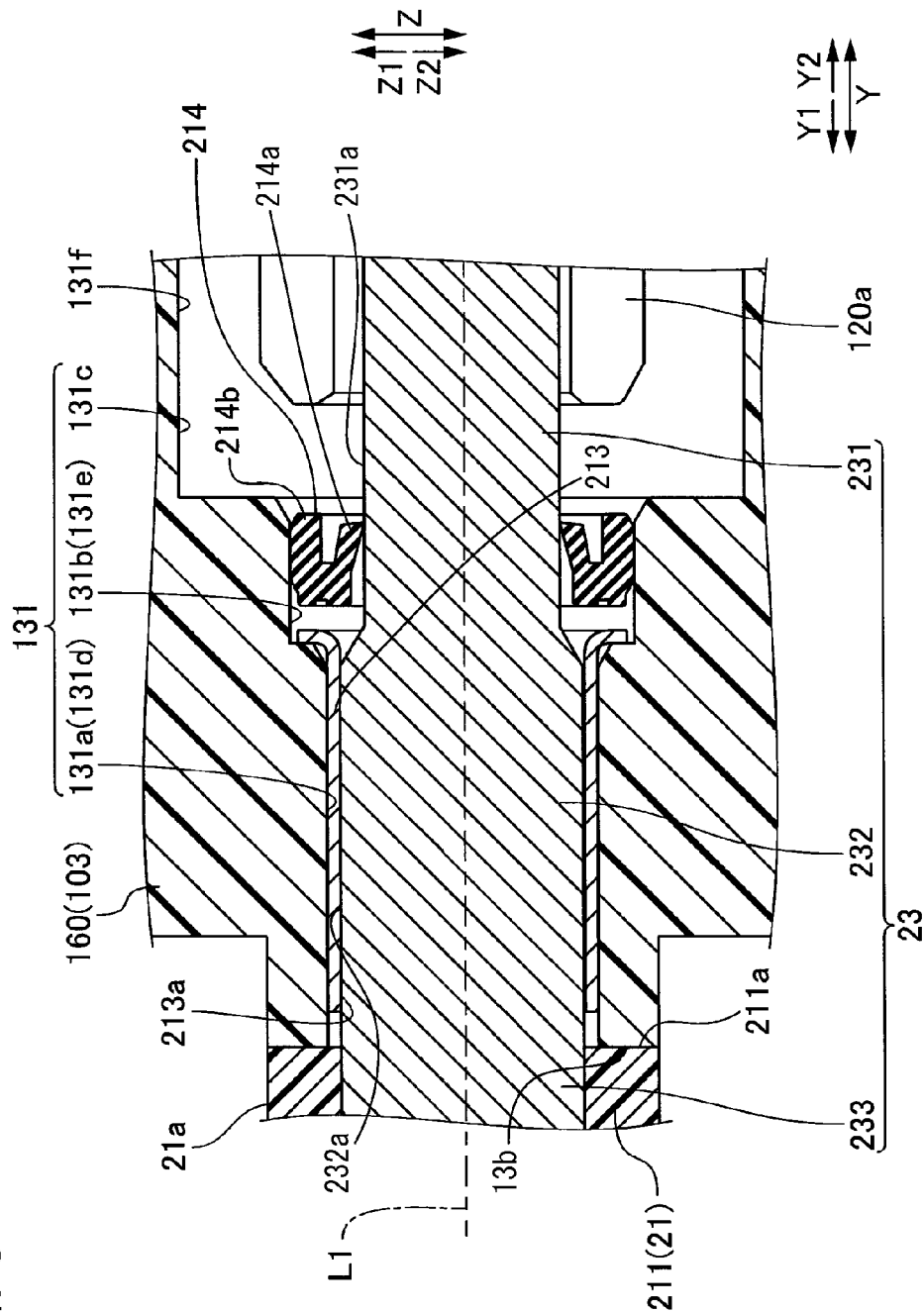
FIG. 6 is an enlarged cross-sectional view illustrating a support structure of a first end portion side (a Y2 direction side) of a valve body of the air intake apparatus according to the embodiment.

As illustrated from FIGS. 4 to 6, the actuator attach portion 160 includes a rotation shaft support hole 131 including a circular-shaped cross section and formed to extend in a direction Y. That is, the actuator attach portion 160 also functions as a rotation shaft support portion. The rotation shaft support hole 131 is configured to include a small-diameter portion 131a, a medium-diameter portion 131b and a large-diameter portion 131c from an inner side of the surge tank 1 (the Y1 side) towards an outer side of the surge tank 1 (the Y2 side) in the above-described order so that an inner diameter of the rotation shaft support hole 131 increases stepwisely in the above-described order.

As illustrated in FIGS. 3 and 4, the fluid passage 41 constituted by the opening portion formed at the partition wall 4 of the surge tank 1 is provided in the vicinity of an end portion of the surge tank 1 (at a Y2 direction side) opposite to the intake air inflow side, and in the vicinity of an end portion of the surge tank 1 (at an X2 direction side) opposite to the side formed with the first air intake ports 3a and the second air intake ports 3b. The fluid passage 41 has a cross-sectional shape corresponding to an outer configuration of the valve body 21 of the air intake control valve 2. The fluid passage 41 is in the form of an elongate hole extended in the direction Y in a plan view, as illustrated in FIG. 4.

Figure 7:
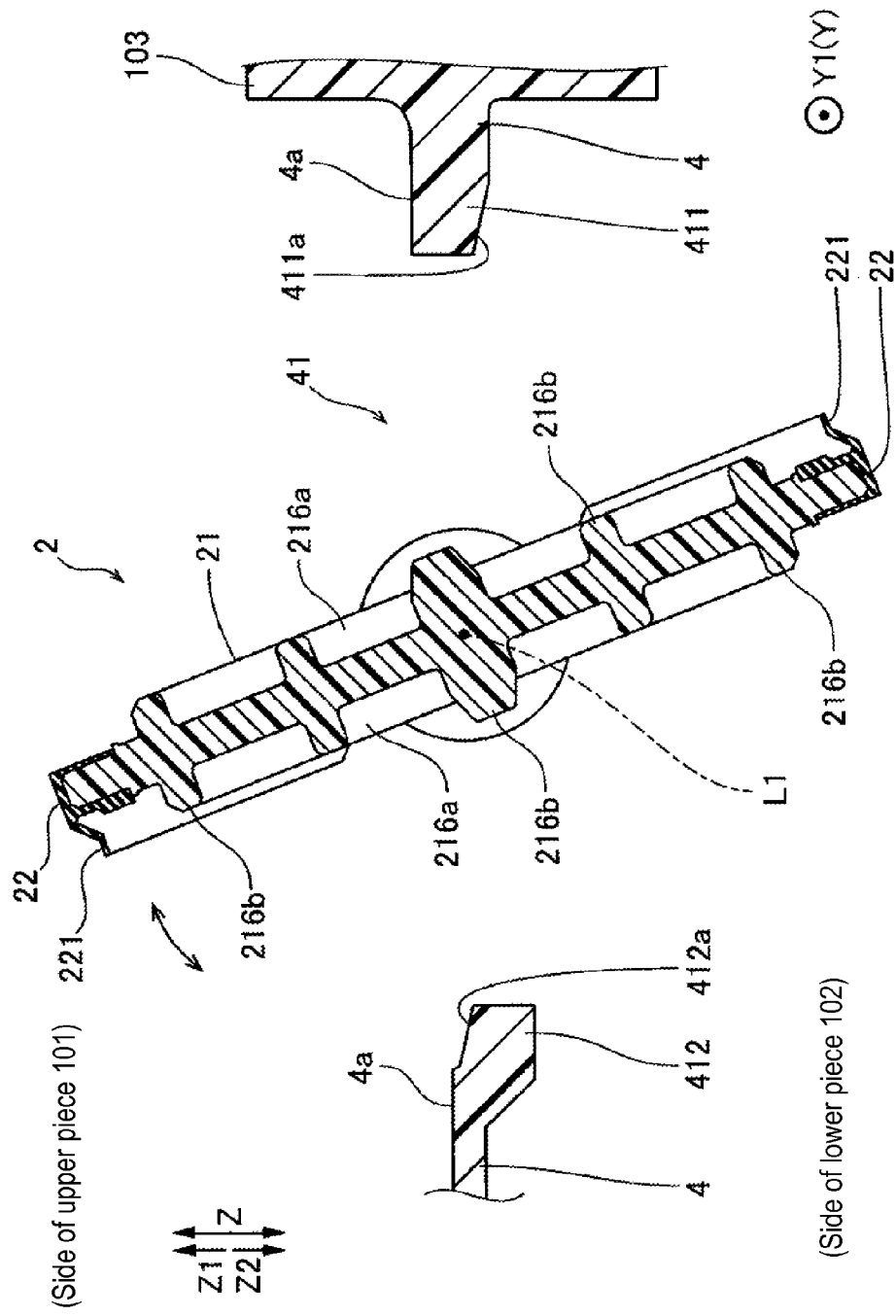
FIG. 7 is a cross-sectional view of the fluid passage when the valve body is at "an open position", which is taken along the line VII-VII in FIG. 3.
Figure 8:
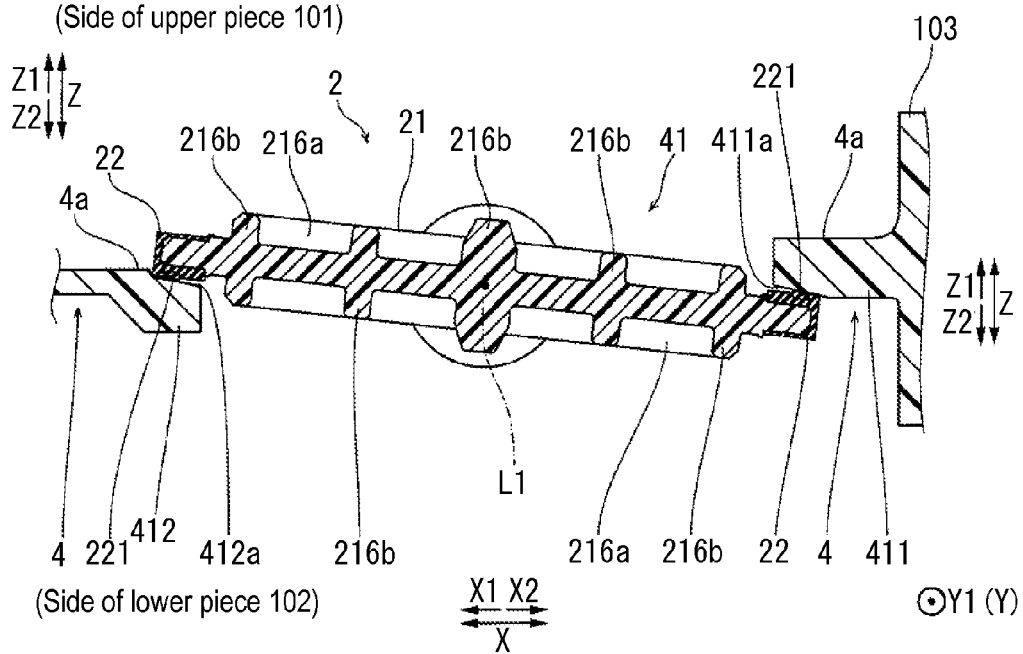
FIG. 8 is a cross-sectional view of the fluid passage when the valve body is at "a closed position", which is taken along the line VIII-VIII in FIG. 3.

As illustrated in FIGS. 3, 4, 7 and 8, an edge portion 411 is formed at an X2 side of the fluid passage 41 of the partition wall 4 to be positioned at the side of the first surge tank region 11. An edge portion 412 (refer to FIGS. 4, 7 and 8) is formed at an X1 side of the fluid passage 41 of the partition wall 4 to be positioned at the side of the second surge tank region 12. Because the valve body 21 exists between the edge portions 411 and 412, the edge portion 412 is arranged slightly at a lower side (the Z2 direction) relative to the edge portion 411 correspondingly. As illustrated in FIGS. 7 and 8, the edge portion 412 includes thickness greater than thickness of other portion of the partition wall 4. A seal surface 411a including an inclined surface inclined upwardly towards an inner side of the fluid passage 41 is formed at a bottom surface (the Z2 side) of the edge portion 411. A seal surface 412a including an inclined surface inclined downwardly towards the inner side of the fluid passage 41 is formed at an upper surface (the Z1 side) of the edge portion 412. As illustrated in FIG. 4, the seal surface 411a and the seal surface 412a are provided along the edge portion 411 and the edge portion 412 of the fluid passage 41, respectively.

Figure 9:
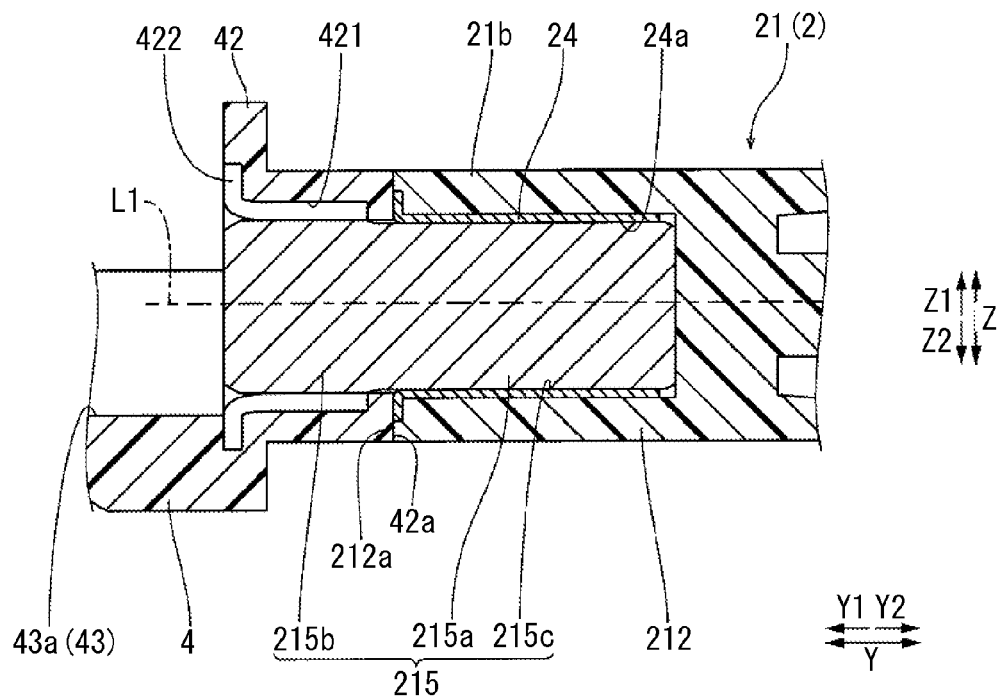
FIG. 9 is an enlarged cross-sectional view illustrating a support structure of a second end portion side (a Y1 direction side) of the valve body of the air intake apparatus according to the embodiment.

As illustrated in FIGS. 3 to 5, the shaft member fixing portion 42 is integrally formed on the partition wall 4. The shaft member fixing portion 42 is provided at an end portion of the fluid passage 41 at a Y1 direction side. As illustrated in FIGS. 4, 5, and 9, the shaft member fixing portion 42 includes a shaft member support hole 421 including a circular cross-section and formed to extend in the direction Y. As illustrated in FIGS. 5 and 9, a bush member 422 made of metal (stainless steel, aluminum alloy, or the like, for example) is integrally provided at the shaft member support hole 421. The bush member 422 is integrally formed (insert-molded) at the partition wall 4 when the middle piece 103 of the surge tank 1 is resin-molded. As illustrated in FIGS. 3 to 5 and 9, a concave escape portion 43 to insert a shaft member 215 (refer to FIG. 9), which will be described later, into the shaft member fixing portion 42 is provided in the vicinity of the shaft member fixing portion 42 of the partition wall 4. The concave escape portion 43 is formed to be concave or recessed downward (towards a Z2 direction side) and extend in the direction Y. As illustrated in FIG. 9, a bottom surface 43a of the escape portion 43 is arranged at the same height position as a lower end of the shaft member support hole 421.

As illustrated in FIGS. 3, 7, 8, and 10, according to the present embodiment, the air intake control valve 2 is rotatably attached to the surge tank 1. The air intake control valve 2 includes the valve body 21 rotated about the rotation shaft line L1 between an open position (the position of the valve body 21 illustrated in FIG. 7) at which the valve body 21 is out of contact with the partition wall 4 and a closed position (the position of the valve body illustrated in FIG. 8) at which the valve body 21 is in contact with the partition wall 4, to open and close the fluid passage 41 of the partition wall 4. The air intake control valve 2 includes a seal member 22 arranged at an outer periphery of the valve body 21. In other words, in the air intake control valve 2 according to the present embodiment, the valve body 21 is rotatably attached directly to the surge tank 1, and no frame (body) or the like to attach the valve body 21 to the surge tank 1 is provided. The valve body 21 is so configured that both a first end portion 21a and a second end portion 21b thereof in a direction (the direction Y) in which the rotation shaft line L1 extends are rotatably supported by the surge tank 1 (the middle piece 103).

Figure 10:
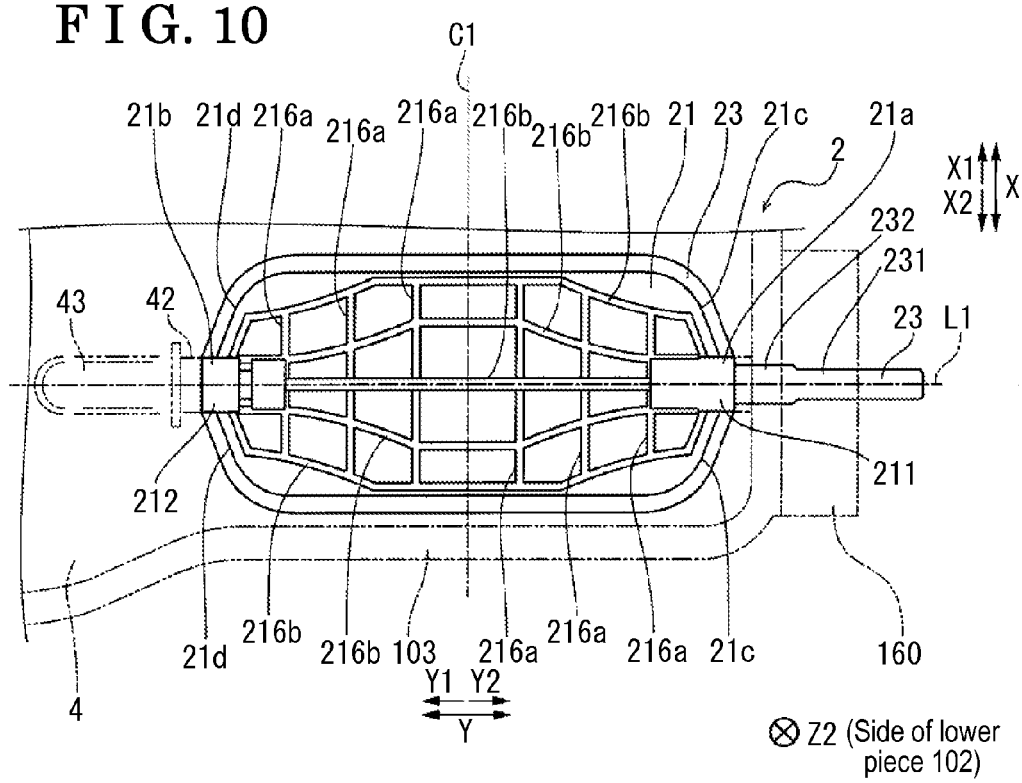
FIG. 10 is a plan view illustrating a state where both the first end portion and the second end portion of the valve body are supported by a surge tank in the air intake apparatus according to the embodiment.

As illustrated in FIG. 10, the valve body 21 has an outer shape symmetric with respect to both the rotation shaft line L1 and a centerline C1 in a direction orthogonal to the rotation shaft line L1 in a state where both the first end portion 21a and the second end portion 21b are rotatably supported by the surge tank 1. Furthermore, the valve body 21 has the outer shape corresponding to the fluid passage 41 (refer to FIG. 4) in a plan view. In the valve body 21, tapered portions 21c and 21d tapered towards the tips of the first end portion 21a and the second end portion 21b are provided in vicinities of the first end portion 21a and the second end portion 21b, respectively.

The valve body 21 is made of resin. As illustrated in FIGS. 5 and 6, the rotation shaft 23 made of metal (stainless steel, aluminum alloy, or the like, for example) rotating together with the valve body 21 is integrally provided at the first end portion 21a of the valve body 21. As illustrated in FIGS. 5 and 9, a first shaft bearing 24 made of metal (stainless steel, aluminum alloy, or the like, for example) rotating together with the valve body 21 is integrally provided at the second end portion 21b of the valve body 21. The rotation shaft 23 and the first shaft bearing 24 each made of metal are insert-molded to be integral with the valve body 21 when the valve body 21 is resin-molded.

Figure 11:
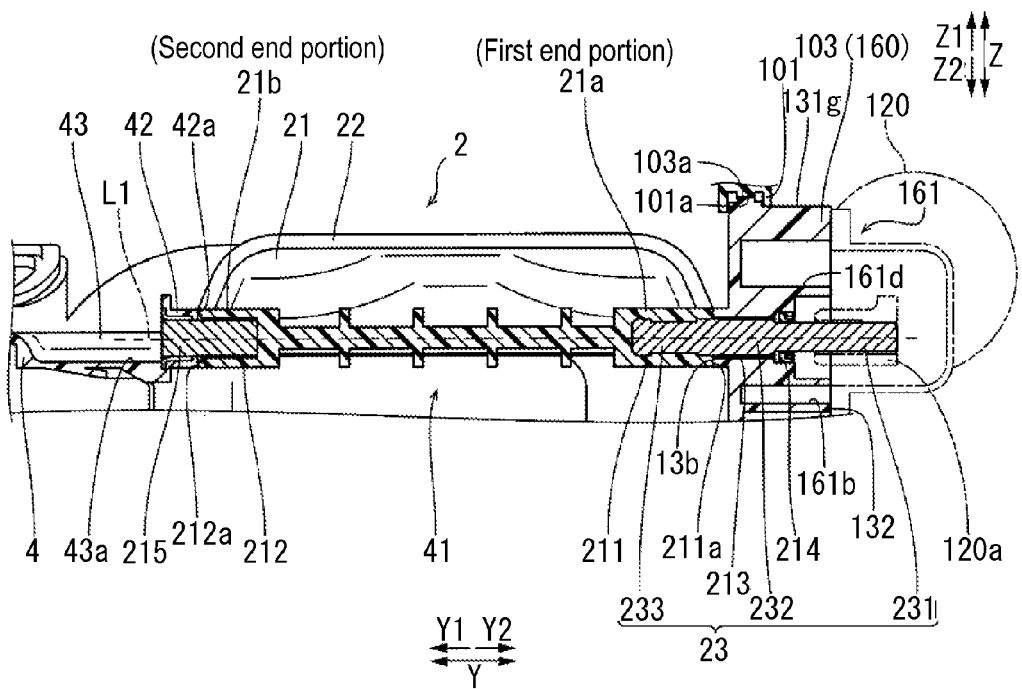
FIG. 11 is a cross-sectional view illustrating a state where the air intake control valve is attached to the surge tank in the air intake apparatus according to the embodiment.

Specifically, a rotation shaft holding portion 211 is formed at the first end portion 21a (the Y2 side) of the valve body 21, and the rotation shaft 23 is held by the rotation shaft holding portion 211. A shaft bearing holding portion 212 is formed at the second end portion 21b (the Y1 side) of the valve body 21, and the first shaft bearing 24 is held by the shaft bearing holding portion 212. As illustrated in FIGS. 6 and 11, the rotation shaft holding portion 211 is so configured that an end surface 211a of the rotation shaft holding portion 211 at the Y2 direction side is opposed to and is in contact with an end surface 13b of the actuator attach portion 160 at the Y1 direction side in a state where the valve body 21 is rotatably supported by the surge tank 1. As illustrated in FIGS. 9 and 11, the shaft bearing holding portion 212 is so configured that an end surface 212a of the shaft bearing holding portion 212 at the Y1 direction side is opposed to and is in contact with an end surface 42a of the shaft member fixing portion 42 at the Y2 direction side.

As illustrated in FIG. 5, the rotation shaft 23 includes a thin shaft portion 231, a thick shaft portion 232 having an outer diameter larger than an outer diameter of the thin shaft portion 231, and a held portion 233 held by the rotation shaft holding portion 211, in this order from a tip portion of the rotation shaft 23 projecting from the valve body 21 towards a base portion of the rotation shaft 23. As illustrated in FIG. 6, the rotation shaft 23 is rotatably supported by a cylindrical second shaft bearing 213 fixed to the actuator attach portion 160 of the middle piece 103. In a state where the rotation shaft 23 is inserted in the rotation shaft support hole 131 of the actuator attach portion 160, the second shaft bearing 213 is press-fitted into a clearance between an outer peripheral surface 232a of the thick shaft portion 232 of the rotation shaft 23 and an inner peripheral surface 131d of the small diameter portion 131a of the rotation shaft support hole 131 to be attached. Thus, the rotation shaft 23 is rotatably supported by the second shaft bearing 213. The second shaft bearing 213 is made of metal (stainless steel, aluminum alloy, or the like, for example), and coating to reduce a sliding resistance with the outer peripheral surface 232a of the thick shaft portion 232 of the rotation shaft 23 is applied to an inner peripheral surface 213a of the second shaft bearing 213.

In the medium diameter portion 131b that is at an outer side relative to the small diameter portion 131a of the rotation shaft support hole 131 which is mounted with the second shaft bearing 213, a rotation shaft sealing member 214 is attached to a clearance between an outer peripheral surface 231a of the thin shaft portion 231 of the rotation shaft 23 and an inner peripheral surface 131e of the medium diameter portion 131b of the rotation shaft support hole 131. The rotation shaft sealing member 214 includes an annular inward projecting portion 214a which projects inward and is annularly provided on an outer periphery of the thin shaft portion 231 of the rotation shaft 23, and an outward projecting portion 214b projecting outward. The thin shaft portion 231 of the rotation shaft 23 is so configured that the outer peripheral surface 231a thereof comes into line contact with the annular inward projecting portion 214a. The annular rotation shaft sealing member 214 includes a U-shaped cross-section and is provided in a state where the open side of the U-shape faces an outside of the surge tank 1 (the Y2 side). The outward projecting portion 214b is configured to annularly come into surface contact with the inner peripheral surface 131e of the medium diameter portion 131b of the rotation shaft support hole 131. Due to the above-described configuration, outside air moving inward from the outside of the surge tank 1 can be effectively sealed or blocked.

As illustrated in FIG. 11, the rotation shaft 23 is provided to project outward from the actuator attach portion 160 in a state where the valve body 21 is rotatably attached to the surge tank 1. A shaft attach portion 120a of the actuator 120 rotating the rotation shaft 23 is mounted on a portion (a region in the vicinity of an end portion of the thin shaft portion 231 at the Y2 side) of the rotation shaft 23 which projects outward from the actuator attach portion 160. That is, at the outside of the surge tank 1, the actuator 120 is fixed to the actuator attach portion 160.

As illustrated in FIG. 9, the first shaft bearing 24 is configured to be rotatably supported by the shaft member 215 fixed to the shaft member fixing portion 42 of the partition wall 4. The shaft member 215 is made of metal (stainless steel, aluminum alloy, or the like, for example) and includes a slide portion 215a sliding relative to the first shaft bearing 24 and a press-fitted portion 215b including an outer diameter larger than an outer diameter of the slide portion 215a. The press-fitted portion 215b having the enlarged outer diameter is press-fitted into the bush member 422 made of metal and provided at the shaft member support hole 421, whereby the shaft member 215 is fixed to the shaft member fixing portion 42. Coating to reduce a sliding resistance with an outer peripheral surface 215c of the slide portion 215a is applied to an inner peripheral surface 24a of the first shaft bearing 24.

As illustrated in FIG. 10, at a front side and a rear side of the valve body 21, plural transverse ribs 216a each extending in the direction orthogonal to the rotation shaft line L1 and plural longitudinal ribs 216b connecting the plural transverse ribs 216a to each other are integrally formed. The transverse ribs 216a in the vicinity of a central portion of the valve body 21 in a lengthwise direction thereof (the direction Y) are formed to extend to the vicinities of both end portions of the valve body 21 in a direction (a direction X) that is orthogonal to the lengthwise direction. The farther away from the central portion in the lengthwise direction towards both end portions of the valve body 21 in the lengthwise direction, the shorter the lengths of the horizontal ribs 216a are. Thus, the transverse ribs 216a in the central portion of the valve body 21 in the lengthwise direction are formed to elongate in the direction X, whereby a mechanical strength of the central portion of the valve body 21 in the lengthwise direction is enhanced.

The seal member 22 is made of an elastic member (rubber, for example) and is configured to provide a seal between the partition wall 4 and the valve body 21 by coming into contact with the partition wall 4 of the surge tank 1 at the closed position of the valve body 21. Specifically, as illustrated in FIGS. 7 and 8, the seal member 22 is configured to come into contact with the sealing surfaces 411a and 412a provided along the edge portions of the fluid passage 41 of the partition wall 4. The seal member 22 includes a protruding portion 221 protruding towards the sealing surfaces 411a and 412a. As illustrated in FIG. 8, at the closed position of the valve body 21, the seal member 22 provides seal between the partition wall 4 and the valve body 21 in a state where the protruding portion 221 is in contact with the sealing surfaces 411a and 412a and the protruding portion 221 is pressed and crushed between the partition wall 4 and the valve body 21. As will be described later in detail, the middle piece 103 with the valve body 21 attached thereto is joined to the lower piece 102 and to the upper piece 101 by the appropriate manufacturing process, and therefore the seal member 22 arranged at the outer periphery of the valve body 21 comes in reliably contact with the sealing surface 411a provided along the edge portion 411 of the fluid passage 41 and with the sealing surface 412a provided along the edge portion 412 of the fluid passage 41 over an entire area of the seal surfaces 411a and 412a. Thus, the seal member 22 is so configured to reliably seal the fluid passage 41.

Figure 12:
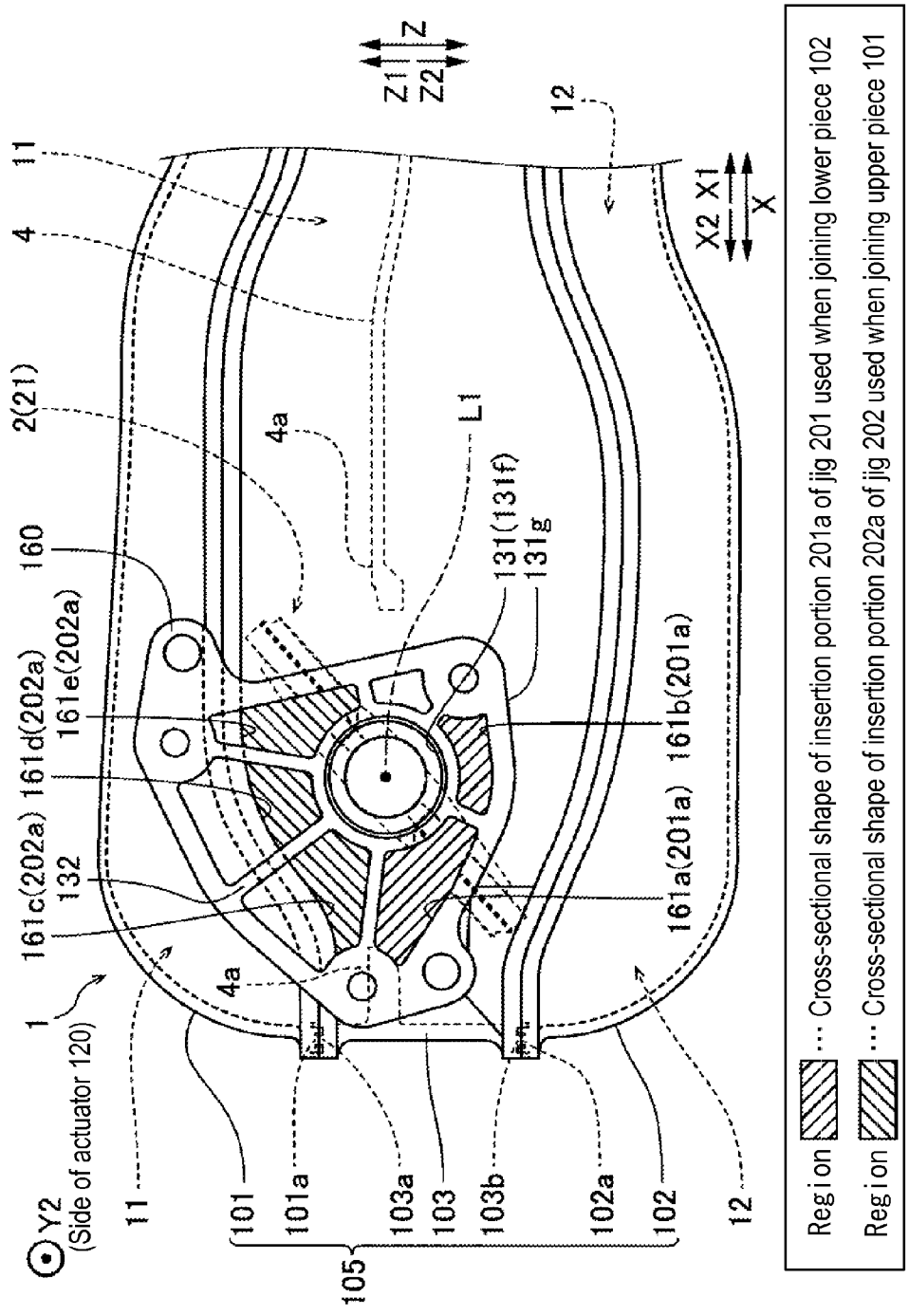
FIG. 12 is a lateral view illustrating a configuration of an actuator attach portion in the air intake apparatus according to the embodiment.

As illustrated in FIGS. 3 to 5, the actuator 120 is attached to an end surface of the actuator attach portion 160 at the Y2 side with screw members 9, for example, two of the screw members 9 (refer to FIG. 3). When the actuator attach portion 160 is viewed from a lateral side as illustrated in FIG. 12, a jig-receiving portion 161 is provided at the actuator attach portion 160, around the rotation shaft support hole 131 penetrating a central portion (the rotation shaft line L1) of the actuator attach portion 160 in the direction Y. The jig-receiving portion 161 includes plural (for example, five) jig-insertion holes 161a, 161b, 161c, 161d and 161e. The jig-insertion holes 161a to 161e are separated from one another by an inner peripheral wall 131f of the rotation shaft support hole 131, by ribs 132 each including a predetermined thickness and extending from the inner peripheral wall 131f radially outwardly, and by an outer peripheral wall 131g forming an outer shape of the actuator attach portion 160 and including a predetermined thickness.

As illustrated in FIG. 5, the jig-insertion hole 161d is extended from the end surface portion of the actuator attach portion 160 at the Y2 side along a direction of the arrow Y1 to a position corresponding to the position of the joint portion 103a. Similarly, the jig-insertion hole 161b is extended from the end surface portion of the actuator attach portion 160 at the Y2 side along the direction of the arrow Y1 to a position corresponding to the position of the joint portion 103b. Each of the jig-insertion holes 161a to 161e is extended to the above-described depth position (towards the Y1 side). The direction (the direction Y) in which the jig-insertion holes 161a to 161e are extended is a direction orthogonal to a joining direction (the direction Z) in which the upper piece 101, the lower piece 102 and the middle piece 103 are joined to one another.

Thus, according to the present embodiment, when the lower piece 102 forming the second surge tank region 12 (the Z2 side) is being joined to the middle piece 103 in the direction Z by the vibration welding in the manufacturing process, the jig-receiving portion 161 (assembly structure including the jig-insertion holes 161a to 161e) of the actuator attach portion 160 receives thereat a jig 201 (refer to FIG. 15) holding the middle piece 103. In addition, when the upper piece 101 forming the first surge tank region 11 (the Z1 side) is being joined to the middle piece 103 by the vibration welding in the manufacturing process, the jig-receiving portion 161 receives thereat a jig 202 (refer to FIG. 16) holding the middle piece 103. Each of the jig 201 and the jig 202 serves as "the jig of the present disclosure.

From among the jig-insertion holes 161a to 161e, each of the jig-insertion hole 161a and the jig-insertion hole 161b is so configured that an insertion portion 201a (refer to FIG. 15) of the jig 201 (refer to FIG. 15) used when joining the lower piece 102 to the middle piece 103 is inserted into each of the jig-insertion hole 161a and the jig-insertion hole 161b. Each of the jig-insertion hole 101c to the jig-insertion hole 101e is so configured that an insertion portion 202a (refer to FIG. 16) of the jig 202 (refer to FIG. 16) used when joining the upper piece 101 to the middle piece 103 is inserted into each of the jig-insertion hole 101c to the jig-insertion hole 101e. At this time, the insertion portion 201a of the jig 201 is inserted to bottom portions (the Y1 side) of the jig-insertion holes 161a and 161b each extended to the position corresponding to the position where the joint portion 103b is formed. In addition, the insertion portion 202a of the jig 202 is inserted to bottom portions (the Y1 side) of the jig-insertion holes 161c to 161e each extended to the position corresponding to the position where the joint portion 103a is formed. The jig-insertion hole 161a and the jig-insertion hole 161b serve as an example of "a second jig-insertion hole" of the present disclosure and the jig-insertion holes 161c, 161d and 161e serve as an example of "a first jig-insertion hole" of the present disclosure.

According to the present embodiment, as illustrated in FIG. 4, a jig-receiving surface 4a including a flat surface is formed at the partition wall 4 of the middle piece 103. The jig-receiving surface 4a is formed at the Z1 side (the front side of the paper surface on which FIG. 4 is drawn at which the first surge tank region 11 is arranged) of the partition wall 4 to surround the fluid passage 41 serving as the opening portion. The jig-receiving surface 4a functions as the jig-receiving portion directly receiving the jig 201 (refer to FIG. 15). In addition, the jig-receiving surface 4a is arranged at an outer side relative to the seal surface 412a (the seal surface 411a) with which the seal member 22 of the valve body 21 which is arranged along the edge portion 412 (the edge portion 411) of the fluid passage 41 is in contact. That is, a half of the jig-receiving surface 4a with respect to the rotation shaft line L1 is constituted by an upper surface (the Z1 side) of the edge portion 411 which is formed by a flat surface. The latter half of the jig-receiving surface 4a is constituted by an upper surface (the Z1 side) of the edge portion 412 which is formed by a flat surface. Thus, it is so configured that the middle piece 103 and the lower piece 102 can be joined to each other in a state where the jig-receiving surface 4a formed by the flat surfaces is directly supported from below by a support portion 201b (refer to FIG. 15) of the jig 201. In a plan view, the support portion 201b of the jig 201 is formed in a shape corresponding to a shape of the jig-receiving surface 4a that is formed in a shape of an elongated hole (a track-shape or an elliptic shape) except for vicinities of the rotation shaft line L1. That is, the support portion 201b of the jig 201 is configured to be in surface contact with the jig-receiving surface 4a circumferentially and continuously except for the vicinities of the rotation shaft line L1.

In the present embodiment, the jig-receiving portion 161 (the jig-insertion holes 161a to 161e) provided at the actuator attach portion 160 of the middle piece 103 is utilized as the receiving portion receiving the jigs 201 and 202. Thus, the air intake apparatus body 105 can be manufactured by joining the lower piece 102 and the upper piece 101 to the middle piece 103 in a manner that after-forming design dimensions of the surge tank 1, that is, design dimensions of the surge tank 1 after the surge tank 1 is formed, is obtained or satisfied. Further, when the middle piece 103 and the lower piece 102 are being joined to each other, the jig-receiving surface 4a of the partition wall 4 is supported from below by the jig 201, in addition to the jig-receiving portion 161 (the jig-insertion holes 161a and 161b). That is, even in a case where curvature or warp deformation (individual differences) which deviates from the design dimensions is generated at each of the upper piece 101, the lower piece 102 and the middle piece 103 (in particular, at the joint portions 101a, 102a, 103a and 103b) when the upper piece 101, the lower piece 102 and the middle piece 103 are resin-molded, the middle piece 103 is vibration-welded to the lower piece 102 in a state where a predetermined shape or configuration of the middle piece 103 is maintained (corrected) by the jig 201 (refer to FIG. 15) and the middle piece 103 is vibration-welded to the upper piece 101 in a state where the predetermined shape of the middle piece 103 is maintained (corrected) by the jig 202 (refer to FIG. 16).

Thus, according to the present embodiment, it is restricted that the lower piece 102 and the upper piece 101 are joined to the middle piece 103 to form the surge tank 1 in a state where strain deformation exceeding an allowable value is generated and remains thereat, such a strain deformation attributes to the curvature or warp deformation occurring at each of the members. In addition, because the partition wall 4 (the jig-receiving surface 4a) around the fluid passage 41 is also supported from below by the support portion 201b (refer to FIG. 15) of the jig 201 at the same time as the jig-insertion holes 161a and 161b of the actuator attach portion 160 receive thereat the insertion portion 201a, it is effectively restricted that deflection deformation including curvature and/or torsion is generated at the region of the seal surfaces 411a and 412a of the partition wall 4 due to the way of load application during the vibration welding. Accordingly, in the surge tank 1 after the air intake apparatus body 105 is formed, the seal member 22 of the valve body 21 is reliably in contact with the seal surfaces 411a and 412a over the entire region of the seal surfaces 411a and 412a. Further, the rotation shaft line L1 is not distorted or strained, and thus the air intake control valve 2 rotates smoothly.

Next, the manufacturing process of the air intake apparatus 100 will be explained with reference to FIGS. 3, 5, 6 and 11 to 16. First, a process or step of attaching the air intake control valve 2 to the middle piece 103 will be explained. Thereafter, a process or step of assembling the entire air intake apparatus body 105 in a state where the air intake control valve 2 is attached to or incorporated in the middle piece 103 will be explained.

Figure 13:
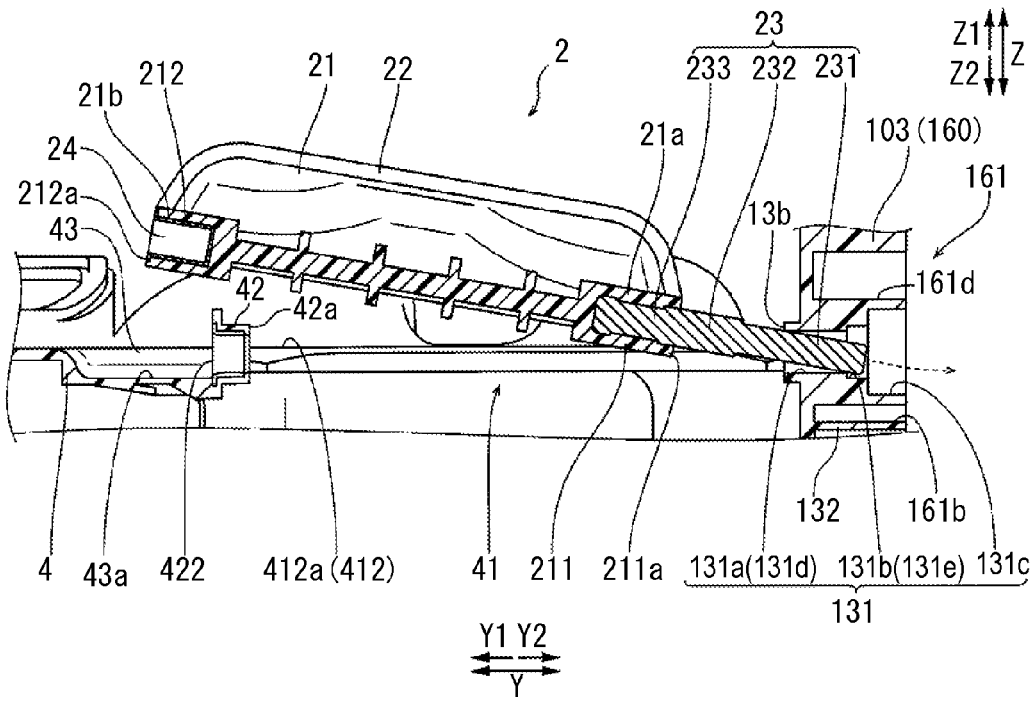
FIG. 13 is a cross-sectional view for explaining a process of attaching the air intake control valve to a middle piece in the air intake apparatus according to the embodiment.

As illustrated in FIGS. 5 and 13, in a state where the rotation shaft 23 and the first shaft bearing 24 are integrally provided at the first end portion 21a and the second end portion 21b of the valve body 21, respectively and the seal member 22 is attached to the outer periphery of the valve body 21, the thin shaft portion 231 of the rotation shaft 23 is inserted into the rotation shaft support hole 131 to which the second shaft bearing 213 has not been attached yet, while the valve body 21 is being inclined relative to the middle piece 103. Because an outer diameter of the thin shaft portion 231 of the rotation shaft 23 is smaller than an outer diameter of the thick shaft portion 232, a sufficient clearance is obtained between the thin shaft portion 231 and the inner peripheral surface 131d of the small diameter portion 131a of the rotation shaft support hole 131 at this time, and also a clearance corresponding to a plate thickness (approximately 1 mm, for example) of the second shaft bearing 213 is obtained between the thick shaft portion 232 of the rotation shaft 23 and the inner peripheral surface 131d of the small diameter portion 131a of the rotation shaft support hole 131. Therefore, the rotation shaft 23 can be easily inserted into the rotation shaft support hole 131 of the middle piece 103, while the valve body 21 is being inclined or tilted.

Figure 14:
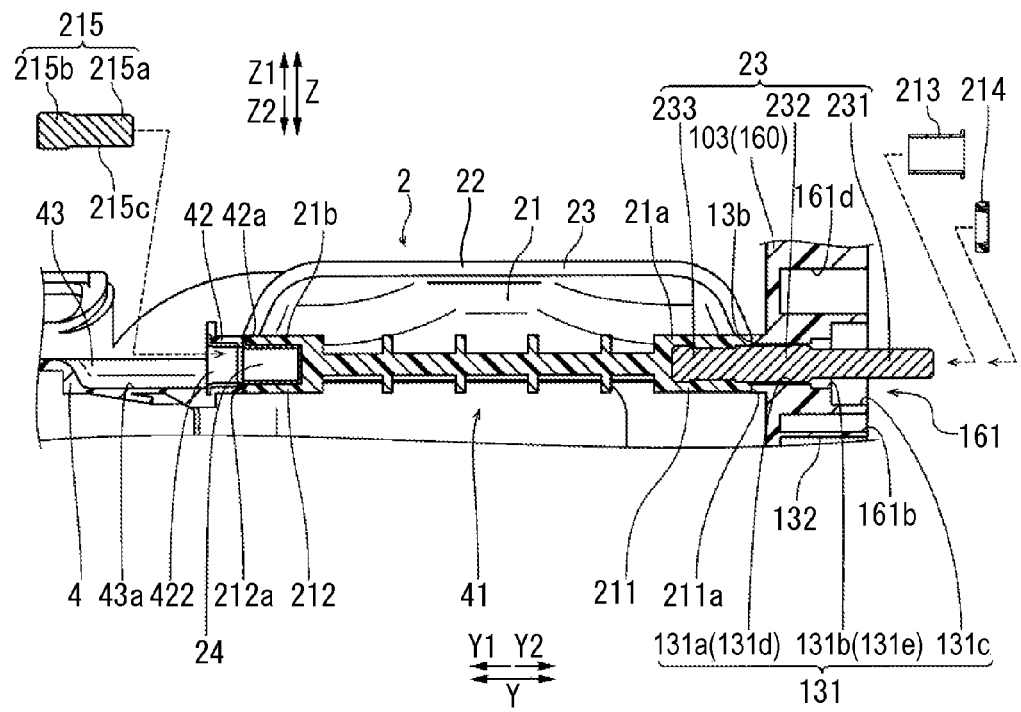
FIG. 14 is another cross-sectional view for explaining the process of attaching the air intake control valve to the middle piece in the air intake apparatus according to the embodiment.

As illustrated in FIGS. 13 and 14, in a state where the rotation shaft 23 at the first end portion 21a of the valve body 21 is inserted in the rotation shaft support hole 131, the second end portion 21b provided with the first shaft bearing 24 is inserted into the fluid passage 41 while the valve body 21 is inclined. Thus, the rotation shaft holding portion 211 of the valve body 21 is opposed to and comes into contact with the actuator attach portion 160 of the middle piece 103, and the shaft bearing holding portion 212 is opposed to and comes into contact with the shaft member fixing portion 42 of the partition wall 4.

Thereafter, as illustrated in FIG. 14, the second shaft bearing 213 is press-fitted into the clearance between the outer peripheral surface 232a (refer to FIG. 6) of the thick shaft portion 232 of the rotation shaft 23 and the inner peripheral surface 131d of the small diameter portion 131a of the rotation shaft support hole 131 at the side of the first end portion 21a of the valve body 21. Then, the annular rotation shaft sealing member 214 is fitted into the clearance between the outer peripheral surface 231a (refer to FIG. 6) of the thin shaft portion 231 of the rotation shaft 23 and the inner peripheral surface 131e of the medium diameter portion 131b of the rotation shaft support hole 131. Thereafter, at the side of the second end portion 21b of the valve body 21, the shaft member 215 is slid along the rotation shaft line L1 of the valve body 21 (along the direction Y) while an internal space of the concave escape portion 43 of the partition wall 4 is being utilized for the insertion of the shaft member 215, and the press-fitted portion 215b is press-fitted into the bush member 422 integrally provided at the shaft member fixing portion 42. At this time, the shaft member 215 is inserted from the side of the slide portion 215a, and is pushed towards the Y2 direction side until the slide portion 215a reaches a position corresponding to the first shaft bearing 24 of the valve body 21. Thus, both the first end portion 21a and the second end portion 21b of the valve body 21 are supported to be rotatable relative to the middle piece 103. Thereafter, as illustrated in FIG. 11, from the outside of the surge tank 1, the shaft attach portion 120a of the actuator 120 configured to rotate the rotation shaft 23 is attached to a portion of the rotation shaft 23 projecting outwardly from the actuator attach portion 160. In this manner, the air intake control valve 2 is attached to the middle piece 103.

Figure 15:
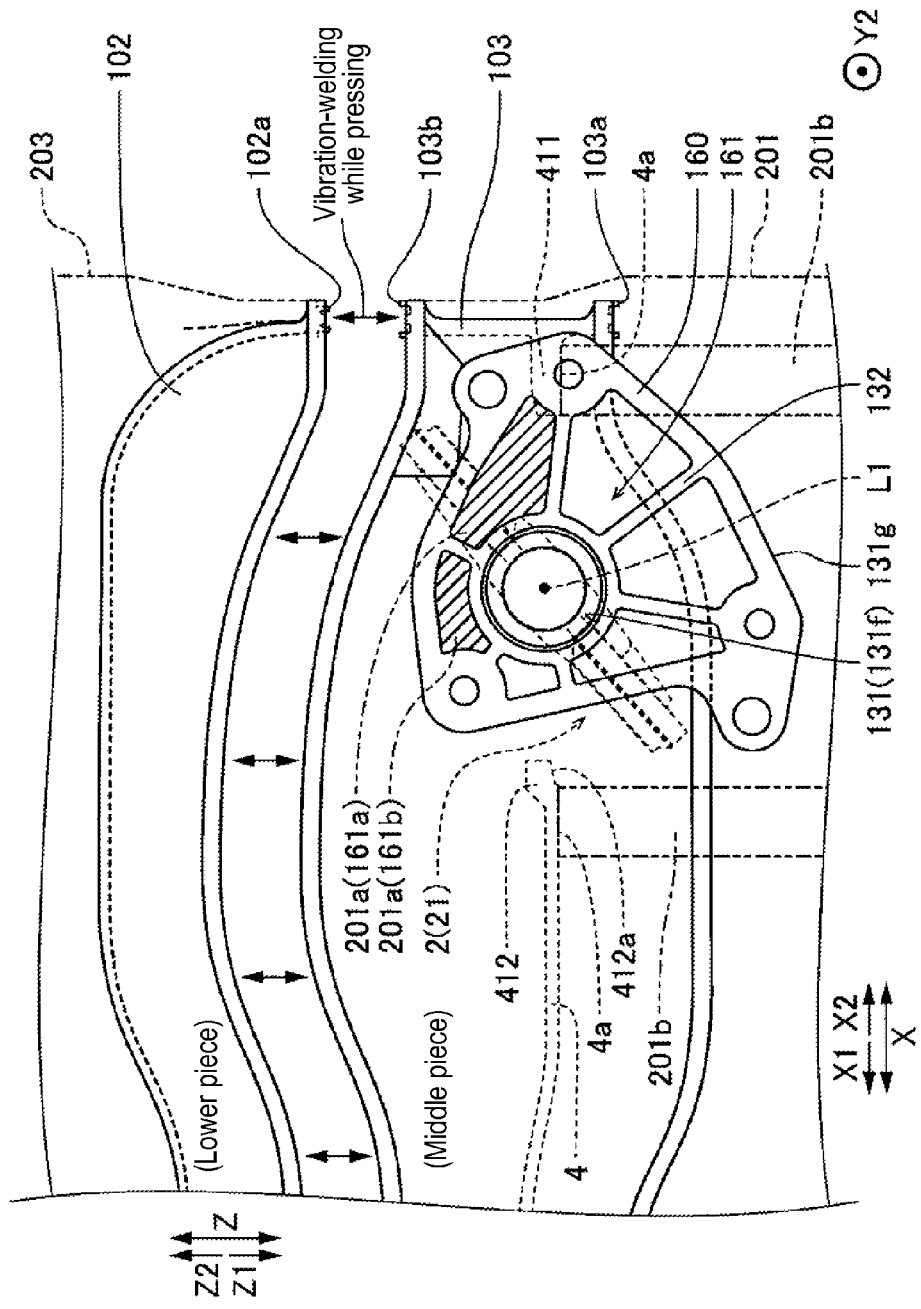
FIG. 15 is a cross-sectional view for explaining a process of joining the middle piece to which the air intake control valve is attached and a lower piece to each other in the air intake apparatus according to the embodiment.

Next, the lower piece 102 is joined to the middle piece 103 to which the air intake control valve 2 is attached. Specifically, as illustrated in FIG. 15, in a state where the lower piece 102 is inverted in the up/down direction so as to be arranged in an orientation opposite to the state illustrated in FIG. 12, the lower piece 102 is attached to the jig 203 (drawn with double-dotted lines). The jig 203 is fixed to the lower piece 102 to support an outer side (an outer peripheral portion) of the joint portion 102a, which is formed in the annular shape, along the entire circumference of the joint portion 102a. Then, in a state where the joint portion 103b of the middle piece 103 faces the lower piece 102, the middle piece 103 is attached to the jig 201 (drawn with double-dotted lines). At this time, the insertion portion 201a of the jig 201 is inserted into the jig-insertion hole 161a and the jig-insertion hole 161b of the jig-receiving portion 161 of the actuator attach portion 160. The insertion portion 201a is inserted to the positions in the jig-insertion holes 161a and 161b which correspond to the position (refer to FIG. 5) where the joint portion 103b is formed. The jig 201 is fixed to the middle piece 103 in a manner that the support portion 201b directly supports the jig-receiving surface 4a from below (from the Z1 side) and that the jig 201 supports an outer side (an outer peripheral portion) of the joint portion 103b, which is formed in the annular shape, along the entire circumference of the joint portion 103b from below (from the Z1 side).

Then, the middle piece 103 is moved upward from below in a direction of the arrow Z2 so that the joint portion 103b of the middle piece 103 and the joint portion 102a of the lower piece 102 face each other. In a state where the joint portion 103b is in surface contact with the joint portion 102a, the middle piece 103 (the Z1 side) is pushed against the lower piece 102 (the Z2 side) with a predetermined load (pressing force). In this state, the lower piece 102 is vibrated in a direction or directions in a horizontal plane for a predetermined time period (approximately 5 seconds, for example) while the middle piece 103 is kept static. Thus, the joint surfaces of the respective joint portion 103b and the joint portion 102a are rubbed against each other, that is, are in friction with each other, thereby generating frictional heat by which the joint portion 103b and the joint portion 102a are welded to each other. Accordingly, the middle piece 103 and the lower piece 102 are joined to each other. As a result, in FIG. 12, a structural body in which the middle piece 103 and the lower piece 102 are joined to each other is formed.

At this time, in a state where the predetermined shape of the middle piece 103 is maintained by the jig 201 and the predetermined shape of the lower piece 102 is maintained by the jig 203, the joint portion 103b and the joint portion 102a are welded to each other. In particular, at the portion of the partition wall 4 around the fluid passage 41 (the jig-receiving surface 4a formed in the annular shape), flatness or evenness is maintained without including the deflection deformation. Thus, flatness or evenness (a degree of parallelization relative to the seal member 22) is maintained at each of the seal surface 411a of the edge portion 411 and the seal surface 412a of the edge portion 412 of the fluid passage 41 of the partition wall 4 in a state where the valve body 21 is attached to the partition wall 4. Further, a shape of a space portion of the second surge tank region 12 (at the Z2 side in FIG. 12) is formed without deflection deforming occurring at the rotation shaft line L1 rotating the valve body 21. Thereafter, the jig 201 and the jig 203 are removed from the middle piece 103 and the lower piece 102.

Figure 16:
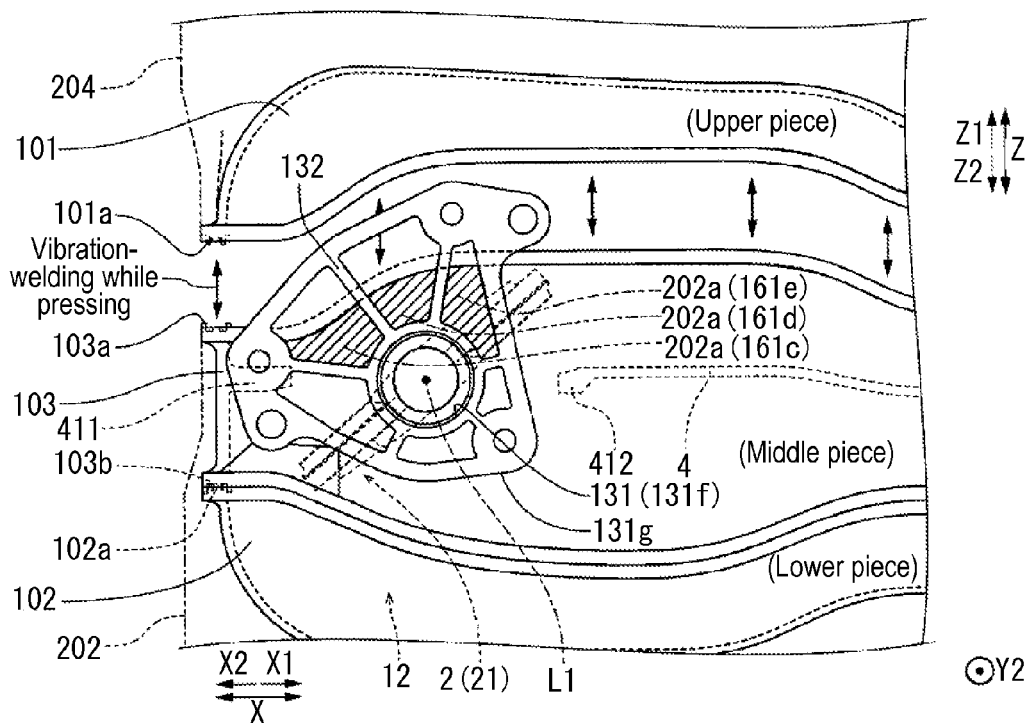
FIG. 16 is a cross-sectional view for explaining a process of joining the middle piece to which the air intake control valve is attached and a lower piece to each other in the air intake apparatus according to the embodiment.

Next, the upper piece 101 is joined to the middle piece 103 to which the lower piece 102 has been joined in advance. Specifically, as illustrated in FIG. 16, the upper piece 101 is attached to the jig 204 (drawn with double-dotted lines). The jig 204 is fixed to the upper piece 101 to support an outer side (an outer peripheral portion) of the joint portion 101a, which is formed in the annular shape, along the entire circumference of the joint portion 101a. Then, in a state where the joint portion 103a of the middle piece 103 faces the upper piece 101, the middle piece 103 is attached to the jig 202 (drawn with double-dotted lines). At this time, the insertion-portion 202a of the jig 202 is inserted into the jig-insertion holes 161c to 161e of the jig-receiving portion 161 of the actuator attach portion 160. The insertion portion 202a is inserted to the portions at the jig-insertion holes 161c to 161e which correspond to the position (refer to FIG. 5) where the joint portion 103a is formed. The jig 202 is fixed to the middle piece 103 to support the outer side (an outer peripheral portion) of the joint portion 103a, which is formed in the annular shape, along the entire circumference of the joint portion 103a.

Then, the middle piece 103 is moved upward from below in a direction of the arrow Z1 so that the joint portion 103a of the middle piece 103 and the joint portion 101a of the upper piece 101 face each other. In a state where the joint portion 103a is in surface contact with the joint portion 101a, the middle piece 103 (the Z2 side) is pushed against the upper piece 101 (the Z1 side) with a predetermined load (pressing force). In this state, the upper piece 101 is vibrated in a direction or directions in a horizontal plane for a predetermined time period (approximately 5 seconds, for example) while the middle piece 103 is being kept static. Thus, the joint surfaces of the respective joint portion 103a and the joint portion 101a are rubbed against each other, that is, are in friction with each other, thereby generating frictional heat by which the joint portion 103a and the joint portion 101a are welded to each other. As a result, the middle piece 103 and the upper piece 101 are joined to each other.

At this time, in a state where the predetermined shape of the middle piece 103 is maintained by the jig 202 and the predetermined shape of the upper piece 101 is maintained by the jig 204, the joint portion 103a and the joint portion 101a are welded to each other. Also in this case, the flatness or evenness (a degree of parallelization relative to the seal member 22) is maintained at each of the seal surface 411a of the edge portion 411 and the seal surface 412a of the edge portion 412 of the fluid passage 41 of the partition wall 4 in a state where the valve body 21 is attached to the partition wall 4 because the flatness or evenness at the portion of the jig-receiving surface 4a is already obtained when the middle piece 103 is joined to the lower piece 102. Further, a shape of a space portion of the first surge tank region 11 (at the Z1 side in FIG. 12) is formed without the deflection deforming occurring at the rotation shaft line L1. Thereafter, the jig 202 and the jig 204 are removed from the middle piece 103 and the upper piece 101.

As described above, according to the present embodiment, first, the lower piece 102 including a relatively higher rigidity than the upper piece 101, and the middle piece 103 are joined to each other. Thereafter, the upper piece 101 including a relatively lower rigidity than the lower piece 102, and the middle piece 103, in a state where the lower piece 102 and the middle piece 103 are already joined to each other, are joined to each other. Finally, as illustrated in FIG. 3, the actuator 120 is attached to the actuator attach portion 160 with the two screw members 9. As described above, the air intake apparatus body 105 is assembled and the air intake apparatus 100 is manufactured. In the present embodiment, the lower piece 102 serves as one of the upper piece 101 and the lower piece 102, and the upper piece 101 serves as the other of the upper piece 101 and the lower piece 102.

According to the present embodiment, the following effects can be obtained.

As described above, according to the present embodiment, at the middle piece 103 to which the valve body 21 is attached, the jig-receiving portion 161 (the jig-insertion holes 161a and 161b) and the jig-receiving surface 4a are provided at the actuator attach portion 160 and at the partition wall 4, respectively. The jig-receiving portion 161 (the jig-insertion holes 161a and 161b) and the jig-receiving surface 4a are provided in the vicinity of the fluid passage 41 and are for receiving the jig 201 (refer to FIG. 15) holding the middle piece 103 while the middle piece 103 and the lower piece 102 are being joined to each other. In addition, the jig-receiving portion 161 (the jig-insertion holes 161c to 161e) for receiving the jig 202 (refer to FIG. 16) holding the middle piece 103 while the middle piece 103 and the upper piece 101 are being joined to each other is provided at the actuator attach portion 160. According to the manufacturing process of the air intake apparatus 100 of the present embodiment, the middle piece 103 and the lower piece 102 are joined to each other by the vibration welding in a state where the jig-receiving portion 161 (the jig-insertion holes 161a and 161b) and the jig-receiving surface 4a are held by the jig 201. The middle piece 103 and the upper piece 101 are joined to each other by the vibration welding in a state where the jig-receiving portion 161 (the jig-insertion holes 161c to 161e) is held by the jig 202. Consequently, the air intake apparatus body 105 is formed.

Thus, when the upper piece 101, the lower piece 102 and the middle piece 103 are joined to each other to manufacture the air intake apparatus body 105, the middle piece 103 can be joined to the lower piece 102 in a state where the middle piece 103 is held by the jig 201 via the jig-receiving portion 161 (the jig-insertion holes 161a and 161b) and the jig-receiving surface 4a which are provided in the vicinity of the fluid passage 41 of the partition wall 4. In addition, the middle piece 103 can be joined to the upper piece 101 in a state where the middle piece 103 is held by the jig 202 via the jig-receiving portion 161 (the jig-insertion holes 161c to 161e). That is, the middle piece 103, and each of the lower piece 102 and the upper piece 101 are joined to each other to form the surge tank 1 while avoiding the deflection deformation such as warp and/or twist as much as possible at the portion of the partition wall 4 (the seal surfaces 411a and 412a) in the vicinity of the fluid passage 41. Thus, after the air intake apparatus body 105 is manufactured, the flatness of the portion of the partition wall 4 (the seal surfaces 411a and 412a) at which the valve body 21 rotates is maintained around the fluid passage 41, and therefore an appropriate sealing performance or sealability is ensured when the valve body 21 is at the closed position.

As described above, the present embodiment includes the air intake apparatus body 105 including the surge tank 1, and the valve body 21 rotatably attached to the surge tank 1 and rotating between the open position where the valve body 21 is out of contact with the partition wall 4 and the closed position where the valve body 21 is in contact with the partition wall 4 to open and close the fluid passage 41 formed at the partition wall 4 dividing the inside of the surge tank 1 into the two parts. Accordingly, the fluid passage 41 formed at the partition wall 4 is directly blocked or closed with the valve body 21 in a case where the valve body 21 rotates to the closed position, and accordingly the opening portion formed at the partition wall 4 can be used as the fluid passage 41 as is, which is opened and closed with the valve body 21. That is, according to the present embodiment, unlike a structure where a fluid passage formed at a frame-shaped body is opened and closed with the valve body, a cross-sectional area of the fluid passage 41 opened and closed by the valve body 21 is not narrower or smaller than a cross-sectional area of the opening portion formed at the partition wall 4. Therefore, the cross-sectional area of the fluid passage 41 can be increased correspondingly. Consequently, in a case where the valve body 21 is positioned at the open position to make the fluid communication between the two space portions, pressure loss of the intake air circulating through the fluid passage 41 can be reduced by the increment of the cross-sectional area of the fluid passage 41, thereby increasing an amount of intake air circulating through the fluid passage 41, and therefore a supercharging effect is enhanced. In addition, the air intake apparatus body 105 does not include the frame-shaped body (the frame) and/or a gasket provided at an outer peripheral surface of the frame-shaped body, and hence the number of components can be reduced to simplify the structure and also simplify the assembling process of the valve body 21.

According to the present embodiment, the middle piece 103 includes the actuator attach portion 160 for attaching the actuator 120 which rotates the valve body 21, and the jig-receiving portion 161 is provided at the actuator attach portion 160. In the manufacturing process of the air intake apparatus 100, the middle piece 103 and the lower piece 102 are joined to each other in a state where the jig-receiving portion 161 of the actuator attach portion 160 is held by the jig 201 (refer to FIG. 15) and the middle piece 103 and the upper piece 101 are joined to each other in a state where the jig-receiving portion 161 of the actuator attach portion 160 is held by the jig 202 (refer to FIG. 16), whereby the air intake apparatus body 105 is formed. Because the jig-receiving portion 161 (the jig-insertion holes 161a to 161e) is provided at the actuator attach portion 160 that is relatively close to the fluid passage 41, the jig-receiving portion 161 of the actuator attach portion 160 is held by the jig 201 (the jig 202), and therefore the middle piece 103 and the lower piece 102 (the upper piece 101) are joined to each other in a state where the portion of the partition wall 4 which is in the vicinity of the fluid passage 41 is easily held. Accordingly, when the middle piece 103, and the lower piece 102 and the upper piece 101 are being joined to each other, it is easily restricted that the deflection deformation occurs at the seal surfaces 411a and 412a which are in the vicinity of the fluid passage 41 and to which the valve body 21 is in contact. In addition, because the actuator attach portion 160 is held by the jig 201 (the jig 202), it is reliably restricted that the rotation shaft support hole 131, into which the rotation shaft 23 of the valve body 21 is inserted, is deflected and deformed (that is, crushed and thus deformed) when the middle piece 103 and the lower piece 102 (the upper piece 101) are being joined to each other.

According to the present embodiment, the actuator attach portion 160 is so configured to include the jig-insertion holes 161a, 161b, 161c, 161d, 161e serving as the jig-receiving portion 161. Accordingly, by inserting the jig 201 or the jig 202 into the jig-insertion holes 161a, 161b, 161c, 161d, 161e that are provided at the actuator attach portion 160, the jig-receiving portion 161 of the actuator attach portion 160 is held by the jig 201 or the jig 202 easily in a simple manner.

According to the present embodiment, the jig-receiving portion 161 is so configured to include the jig-insertion holes 161c to 161e into which the insertion portion 202a of the jig 202 (refer to FIG. 16) is inserted while the middle piece 103 and the upper piece 101 are being joined to each other and which are arranged at a side closer to the upper piece 101 than to the lower piece 102. In addition, the jig-receiving portion 161 is so configured to include the jig-insertion holes 161a and 161b into which the insertion portion 201a of the jig 201 (refer to FIG. 15) is inserted when the middle piece 103 and the lower piece 102 are being joined to each other and which are arranged at a side closer to the lower piece 102 than to the upper piece 101. Accordingly, when the upper piece 101 is being joined to the middle piece 103 including the partition wall 4, the portion of the jig-receiving portion 161 (the middle piece 103) which is in the vicinity of the joined portion with the upper piece 101 is reliably held via the jig-insertion holes 161c to 161e provided at the middle piece 103 to be arranged closer relative to the upper piece 101. In addition, when the lower piece 102 is being joined to the middle piece 103, the portion of the jig-receiving portion 161 (the middle piece 103) which is in the vicinity of the joined portion with the lower piece 102 is reliably held via the jig-insertion holes 161a and 161b provided at the middle piece 103 to be arranged closer relative to the lower piece 102.

According to the present embodiment, the middle piece 103 includes the partition wall 4 dividing the inside of the surge tank 1 into the two parts, and the partition wall 4 is provided with the jig-receiving surface 4a constituted by the flat surface surrounding the fluid passage 41. The middle piece 103 and the lower piece 102 are joined to each other in a state where the jig-receiving surface 4a constituted by the flat surface is held by the support portion 201b of the jig 201 (refer to FIG. 15). Accordingly, the jig-receiving surface 4a constituted by the flat surface is supported directly by the support portion 201b of the jig 201, and thus the middle piece 103 and the lower piece 102 can be joined to each other in a state where the vicinity of the seal surfaces 411a and 412a surrounding the fluid passage 41 of the partition wall 4 is reliably held. Consequently, the seal surfaces 411a and 412a, which are in the vicinity of the fluid passage 41 and with which the valve body 21 is in contact, are reliably restricted from being deflected or deformed when the middle piece 103 and the lower piece 102 are being joined to each other.

According to the present embodiment, the jig-receiving surface 4a is arranged at the outer side relative to the seal surface 412a with which the seal member 22 of the valve body 21 is configured to be in contact. The seal member 22 is provided along the edge portion 412 of the fluid passage 41. Accordingly, the lower piece 102 can be joined to the middle piece 103 in a state where the jig-receiving surface 4a at the outer side than the seal surface 412a of the middle piece 103 is supported by the support portion 201b of the jig 201 without causing the support portion 201b of the jig 201 to be in contact with the seal surface 412a. Consequently, after the air intake apparatus body 105 is formed, the seal surface 412a does not include, for example, a dent (trace or mark made by the application of load) caused by the support portion 201b of the jig 201 and the flatness of the seal surface 412a is maintained. As a result, the sealability at the fluid passage 41 by the valve body 21 is sufficiently ensured.

According to the present embodiment, each of the jig-insertion holes 161a to 161e is formed to extend in the direction Y that is orthogonal to the joining direction (the direction Z) in which the middle piece 103 and the lower piece 102 (the upper piece 101) are joined to each other. Accordingly, in a case where the middle piece 103 and the lower piece 102 (the upper piece 101) are made to face each other in the direction Z and then to be joined to each other in the direction Z, the jig-insertion portion 201a of the jig 201 (the jig-insertion portion 202a of the jig 202) can be inserted into the respective jig-insertion holes 161a to 161e from a lateral side (from the outer side) which is orthogonal to the joining direction. Consequently, the jig-receiving portion 161 (the actuator attach portion 160) of the middle piece 103 is supported easily in a simple manner when the middle piece 103 and the lower piece 102 (the upper piece 101) are being joined to each other.

According to the present embodiment, the middle piece 103 includes the joint portion 103b configured to be joined to the lower piece 102 and the joint portion 103a configured to be joined to the upper piece 101. The jig-receiving portion 161 is provided at the middle piece 103 so that the jig 201 (the insertion portion 201a) is received at the position corresponding to the joint portion 103b of the middle piece 103 and that the jig 202 (the insertion portion 202a) is received at the position corresponding to the joint portion 103a of the middle piece 103. Accordingly, the jig 201 is arranged at the position corresponding to the joint portion 103b of the middle piece 103 at which the middle piece 103 is joined to the lower piece 102, and the jig 202 is arranged at the position corresponding to the joint portion 103a of the middle piece 103 at which the middle piece 103 is joined to the upper piece 101. Consequently, the pressing force (a pressure-joining force) during the joining of the middle piece 103 and the lower piece 102 (the upper piece 101) can be received at the side of the jig 201 (the jig 202) appropriately via the jig-receiving portion 161. As a result, the middle piece 103 and the lower piece 102 (the upper piece 101) are reliably joined to each other in a state where the joint portion 103b (the joint portion 103a) of the middle piece 103 is stably held by the jig 201 (the jig 202).

According to the manufacturing process of the air intake apparatus 100 of the present embodiment, the air intake apparatus body 105 is formed in the following manner. The lower piece 102 of which the rigidity is relatively high and the middle piece 103 which is in a state where the jig-receiving portion 161 is held by the jig 201 (refer to FIG. 15) are joined to each other by the vibration welding. Thereafter, the upper piece 101 of which the rigidity is relatively low and the middle piece 103 is further joined to each other in a state where the lower piece 102 of which the rigidity is relatively high and the middle piece 103 have been joined to each other and the jig-receiving portion 161 is held by the jig 202 (refer to FIG. 16). Accordingly, the lower piece 102 including the relatively high rigidity and an appropriate load-bearing performance during the vibration-welding, and the middle piece 103 including the partition wall 4 are joined to each other first so that the structural body including little or small distortion (that is, the structure including the accurate design dimension) is obtained. Thereafter, the upper piece 101 including the relatively low rigidity is joined to the above-described structural body including the little or small distortion (that is, the structural body including the accurate design dimension). Thus, the air intake apparatus body 105 is formed in the above-described manner. Consequently, even in a case where the upper piece 101, the lower piece 102 and the middle piece 103 are joined to one another by the vibration welding, the flatness is ensured at the portion of the partition wall 4 (the seal surfaces 411a and 412a) where the valve body 21 is rotated. Further, the air intake apparatus body 105 including, after completion of the manufacture thereof, the accurate design dimension is easily obtained.

According to the manufacturing process of the air intake apparatus 100 of the present embodiment, in the process of forming the air intake apparatus body 105, the middle piece 103 and the lower piece 102 are joined to each other by the vibration welding in a state where the jig-receiving surface 4a of the middle piece 103, the jig-receiving surface 4a being constituted by the flat surface, is supported by the support portion 201b of the jig 201 and where the insertion portion 201a of the jig 201 is inserted in the jig-insertion hole 161a and the jig-insertion hole 161b of the middle piece 103 (refer to FIG. 15). Thereafter, the middle piece 103 to which the lower piece 102 has been joined and the upper piece 101 are joined to each other by the vibration welding in a state where the insertion portion 202a of the jig 202 is inserted in the jig-insertion holes 161c to 161e of the middle piece 103 (refer to FIG. 16). Because the middle piece 103 is joined in advance to the lower piece 102 including the relatively high rigidity and the appropriate load-bearing performance during the vibration-welding, the structural body including the little or small distortion (that is, the structural body including the accurate design dimension) is formed. While the middle piece 103 is being joined to the lower piece 102, the middle piece 103 is in a state where the jig-receiving surface 4a is supported by the support portion 201b of the jig 201 at the same time as the insertion portion 201a of the jig 201 is inserted into the jig-insertion holes 161a and 161b which are arranged at the middle piece 103 to be positioned at the side closer to the lower piece 102, and thus the jig-receiving portion 161 in the vicinity of the joint portion with the lower piece 102 and the jig-receiving surface 4a are reliably held or supported. Then, after the lower piece 102 is joined to the middle piece 103, the middle piece 103 is joined to the upper piece 101 including the relatively low rigidity. While the middle piece 103 is being joined to the upper piece 101, the middle piece 103 is in a state where the insertion portion 202a of the jig 202 is inserted into the jig-insertion holes 161c to 161e which are arranged at the middle piece 103 to be positioned at the side closer to the upper piece 101 and thus the portion of the jig-receiving portion 161 which is in the vicinity of the joined portion with the upper piece 101 is reliably held. Thus, the occurrence of the distortion can be prevented or reduced. Consequently, even in a case where the upper piece 101, the lower piece 102 and the middle piece 103 are joined to one another by the vibration welding, the flatness of the portion of the partition wall 4 (the seal surfaces 411a and 412a) where the valve body 21 rotates is ensured. Further, the air intake apparatus body 105 including, after completion of the manufacture thereof, the accurate design dimension is easily obtained.

The embodiment disclosed here is considered as illustrative in all points and not restrictive. The range of the present disclosure is illustrated not by the above description of the embodiment but by the scope of claims, and all modifications within the meaning and range equivalent to the scope of the claims are included.

For example, while the example of applying "the air intake apparatus" according to the present disclosure to the V-type 6-cylinder engine for an automobile is illustrated in the aforementioned embodiment, the present disclosure is not restricted to this. The air intake apparatus according to the present disclosure may be applied to an internal-combustion engine other than an engine for an automobile, or the air intake apparatus according to the present disclosure may be applied to a V-type multi-cylinder engine other than the V-type 6-cylinder engine and/or to an inline or straight engine or the like.

In the aforementioned embodiment, the example is described where the first surge tank region 11 and the second surge tank region 12 which are separated from each other by the partition wall 4 are arranged to be parallel to each other (adjacent to each other) in the up/down direction (the vertical direction), however, the present disclosure is not restricted to this. According to the present disclosure, the first surge tank region 11 and the second surge tank region 12 may be arranged parallel to each other (adjacent to each other) in the horizontal direction, or the first surge tank region 11 and the second surge tank region 12 may be arranged parallel to each other (adjacent to each other) in a direction other than the vertical direction and the horizontal direction.

In the aforementioned embodiment, the example of integrally providing the rotation shaft 23 at the first end portion 21a (the end portion in the Y2 direction) of the valve body 21 and integrally providing the first shaft bearing 24 at the second end portion 21b (the end portion in the Y1 direction) of the valve body 21 is illustrated, however, the present disclosure is not restricted to this. According to the present disclosure, the first shaft bearing 24 may be integrally provided at the first end portion 21a of the valve body 21, and the rotation shaft 23 may be integrally provided at the second end portion 21b of the valve body 21. Alternatively, the rotation shaft 23 may be integrally provided at each of the first end portion 21a of the valve body 21 and the second end portion 21b of the valve body 21.

In the aforementioned embodiment, the example where the valve body 21 is made of resin and each of the rotation shaft 23, the first shaft bearing 24, the second shaft bearing 213, the shaft member 215, and the bush member 422 is made of metal, however, the present disclosure is not restricted to this. According to the present disclosure, the valve body 21 may be made of a material other than resin, including metal, or each of the rotation shaft 23, the first shaft bearing 24, the second shaft bearing 213, the shaft member 215, and the bush member 422 may be made of a material other than metal, including resin, for example.

Figure 17:
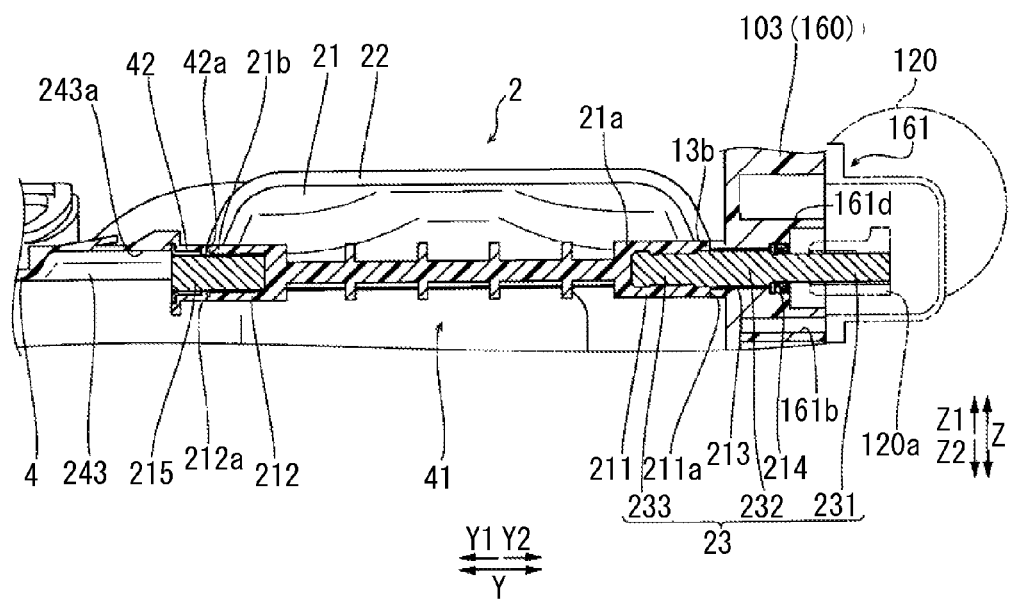
FIG. 17 is a cross-sectional view illustrating a modification of the embodiment disclosed here, where an escape portion of the air intake apparatus is concave upward.

In the aforementioned embodiment, the example of the concave escape portion 43 formed to be concave downward (towards the Z2 direction side) is illustrated, however, the present disclosure is not restricted to this. According to the present disclosure, a concave escape portion 243 may be formed to be concave upward (towards a Z1 direction side) so that an inner surface 243a of the concave escape portion 243 includes a convex shape on the upper side, as in a modification illustrated in FIG. 17. According to the above-described configuration, an extraneous material or foreign matters such as oil can be inhibited from accumulating in the concave escape portion 243, and hence the valve body 21 can be inhibited from being unstably rotated in the opening and closing operation of the valve body 21 due to accumulation of the extraneous material such as oil. Furthermore, even in a case where the concave escape portion 43 is formed to be concave downward (towards the Z2 direction side) as in the aforementioned embodiment, the extraneous material such as oil can be inhibited from accumulating in the concave escape portion 43 by reducing (shallowing) the depth of the concave escape portion.

In the aforementioned embodiment, the example where the jig-insertion holes 161a to 161e of the actuator attach portion 160 and the jig-receiving surface 4a of the partition wall 4 serve as "the jig-receiving portion" of the present disclosure which are provided at the middle piece 103. However, the present disclosure is not restricted thereto. For example, when the middle piece 103 and the lower piece 102 are being joined to each other, the vibration welding may be performed in a state where a portion of the jig 201 is in contact also with the concave escape portion 43 of the partition wall 4. That is, the escape portion 43 may be used as "the jig-receiving portion" of the present disclosure.

In the aforementioned embodiment, the example of joining the lower piece 102 to the middle piece 103, and then joining the upper piece 101 to the middle piece 103 in this order to form the air intake apparatus 105, however, the present disclosure is not restricted thereto. That is, in a case where the upper piece 101 includes a relatively higher rigidity, the upper piece 101 may be joined to the middle piece 103, and then the lower piece 102 may be joined to the middle piece 103 in this order to form the air intake apparatus 105. In this case, the middle piece 103 may be so configured that "the jig-receiving surface" of the present disclosure is arranged at the side of the partition wall 4, the side which faces the lower piece 102.

In the aforementioned embodiment, the example where the jig-insertion holes 161c, 161d and 161e constitute "the first jig-insertion hole" of the present disclosure, and the jig-insertion holes 161a and 161b constitute "the second jig-insertion hole" of the present disclosure, however, the present disclosure is not restricted thereto. That is, the number of "the first jig-insertion hole" and "the second jig-insertion hole" of the present disclosure may be a number other than the numbers described above.

In the aforementioned embodiment, the example is illustrated where the actuator attach portion 160 of the middle piece 103 is held from the inner side of the surge tank 1 in a manner that the jig 201 (the jig-insertion portion 201a) or the jig 202 (the jig insertion portion 202a) is inserted in the jig-insertion holes 161a to 161e when the lower piece 102 is being joined to the middle piece 103 and then when the upper piece 101 is being joined to the middle piece 103 sequentially, however, the present disclosure is not restricted thereto. For example, in addition to that the jig (the jig-insertion portion) is inserted into the jig-insertion holes 161a to 161e, a holding portion configured to circumferentially hold the outer peripheral wall 131g of the actuator attach portion 160 (refer to FIG. 12) may be provided at the jig 201 and/or the jig 202. That is, the lower piece 102 and the upper piece 101 may be joined to the middle piece 103 sequentially in a state where the middle piece 103 is held with the use of the jig configured to hold the actuator attach portion 160 at both the inner side and the outer side of the surge tank 1. Thus, the upper piece 101, the lower piece 102 and the middle piece 103 can be joined to one another in a manner that the deformation is even more restricted from occurring at the portion of the partition wall 4 around the fluid passage 41 when the surge tank 1 is formed (vibration-welded). Accordingly, the flatness of the portion of the partition wall 4 where the valve body 21 is rotated (the seal surfaces 411a and 412a) can be maintained more effectively around the fluid passage 41. In addition, the rotation shaft line L1 is effectively prevented from being distorted.

According to the aforementioned embodiment, the air intake apparatus 100 includes the air intake apparatus body 105 including the surge tank 1 for the V-type 6-cylinder engine 10, the valve body 21 rotatably attached to the surge tank 1 and configured to rotate between the open position and the closed position to open and close the fluid passage 41 formed at the partition wall 4 dividing the inside of the surge tank 1 into the two parts. The valve body 21 is out of contact with the partition wall 4 at the open position and is in contact with the partition wall 4 at the closed position. The air intake apparatus body 105 is formed by the middle piece 103 (the first member) to which the valve body 21 is attached and the upper piece 101 and the lower piece 102 (the second member) joined to each other, and the middle piece 103 includes the jig-receiving portions 161 and 4a arranged in the vicinity of the fluid passage 41 and configured to receive the jigs 201 and 202 holding the middle piece 103 when the middle piece 103 and the upper piece 101 (the lower piece 102) are being joined to each other.

According to the above-described configuration, the jig-receiving portions 161 and 4a arranged in the vicinity of the fluid passage 41 for receiving the jigs 201 and 202 holding the middle piece 103 when the middle piece 103 and the lower piece 102 (the upper piece 101) are being joined to each other is provided at the middle piece 103 to which the valve body 21 is attached. Accordingly, when the upper piece 101 (the lower piece 102) and the middle piece 103 are being joined to each other to manufacture the air intake apparatus body 105, the middle piece 103 can be joined to the lower piece 102 (the upper piece 101) in a state where the middle piece 103 is held by the jig 201 (the jig 202) via the jig-receiving portion 161, 4a provided in the vicinity of the fluid passage 41 of the partition wall 4. That is, the middle piece 103 and the lower piece 102 (the upper piece 101) are joined to each other to form the surge tank 1 while avoiding, as much as possible, the deflection deformation such as the warp and/or twist at the portion of the partition wall 4 (the seal surfaces 411a and 412a) in the vicinity of the fluid passage 41. Consequently, after the air intake apparatus body 105 is manufactured, the flatness of the portion of the partition wall 4 (the seal portion) where the valve body 21 is rotated is maintained around the fluid passage 41, and therefore the appropriate sealing performance or sealability is ensured when the valve body 21 is at the closed position.

In addition, according to the above-described configuration, the air intake apparatus 100 includes the air intake apparatus body 105 including the surge tank 1, the valve body 21 rotatably attached to the surge tank 1 and configured to rotate between the open position and the closed position to open and close the fluid passage 41 formed at the partition wall 4 dividing the inside of the surge tank 1 into the two parts. The valve body 21 is out of contact with the partition wall 4 at the open position and is in contact with the partition wall 4 at the closed position. Accordingly, by rotating the valve body 21, the fluid passage 41 formed at the partition wall 4 is directly blocked or closed. That is, the opening portion formed at the partition wall 4 can be utilized, as is, as the fluid passage 41 opened and closed with the valve body 21, whereby the cross-sectional area of the fluid passage 41 can be increased accordingly. Thus, in a case where the valve body 21 rotates to the open position to establish the fluid communication between the two space portions, the pressure loss of the intake air circulating or flowing through the fluid passage 41 is reduced and the amount of intake air flowing through the fluid passage 41 is increased, and therefore the supercharging effect is enhanced.

According to the air intake apparatus 100 of the present disclosure, as described above, in a case where the valve body 21 is at the open position, the amount of intake air that flows or circulates through the fluid passage 41 allowing the fluid communication between the two space portions within the surge tank 1 is increased, and therefore the supercharging effect is enhanced. Further, the appropriate sealing performance or sealability is ensured in a case where the valve body 21 is at the closed position.

According to the aforementioned embodiment, the first member 103 includes the actuator attach portion 160 to which the actuator 120 rotating the valve body 21 is configured to be attached, the jig-receiving portion 161 is provided at the actuator attach portion 160, and the air intake apparatus body 105 is formed by the middle piece 103, and the upper piece 101 and the lower piece 102 that are joined to each other in a state where the jig-receiving portion 161 of the actuator attach portion 160 is held by the jigs 201 and 202.

According to the above-described configuration, the jig-receiving portion 161 is provided at the portion of the actuator attach portion 160 that is relatively close to the fluid passage 41. Consequently, because the jig-receiving portion 161 of the actuator attach portion 160 is held by the jig 201 and 202, the middle piece 103 and the lower piece 102 (the upper piece 101) are joined to each other in a state where the portion in the vicinity of the fluid passage 41 is easily held. As a result, the seal portion (the seal surfaces 411a and 412a) with which the valve body 21 is configured to be in contact is easily restricted from being deflected or deformed while the middle piece 103 and the lower piece 102 (the upper piece 101) are being joined to each other.

According to the aforementioned embodiment, the actuator attach portion 160 includes the jig-insertion holes 161a, 161b, 161c, 161d, 161e serving as the jig-receiving portion 161.

According to the above-described configuration, by inserting the jigs 201 and 202 into the corresponding jig-insertion holes 161a to 161e that are provided at the actuator attach portion 160, the jig-receiving portion 161 of the actuator attach portion 160 is easily held by the jigs 201 and 202.

According to the aforementioned embodiment, the first member corresponds to the middle piece 103 including the partition wall 4 dividing the inside of the surge tank 1 into the two parts, the second member corresponds to the upper piece 101 arranged at the upper surface side of the partition wall 4 and the lower piece 102 arranged at the lower surface side of the partition wall 4, the jig-insertion holes 161a, 161b, 161c, 161d, 161e include the first jig-insertion holes 161c, 161d, 161e into which the jig 202 is inserted when the middle piece 103 and the upper piece 101 are being joined to each other, and the second jig-insertion holes 161a, 161b into which the jig 201 is inserted when the middle piece 103 and the lower piece 102 are being joined to each other. The first jig-insertion holes 161c, 161d, 161e are arranged at the side which is closer to the upper piece 101 than to the lower piece 102, and the second jig-insertion holes 161a, 161b are arranged at the side which is closer to the lower piece 102 than to the upper piece 101.

According to the above-described configuration, when the upper piece 101 is being joined to the middle piece 103 including the partition wall 4, the portion of the jig-receiving portion 161 (the middle piece 103) which is in the vicinity of the joined portion with the upper piece 101 is reliably held via the first jig-insertion holes 161c to 161e arranged in the middle piece 103, at the side closer to the upper piece 101. In addition, when the lower piece 102 is being joined to the middle piece 103, the portion of the jig-receiving portion 161 (the middle piece 103) which is in the vicinity of the joined portion with the lower piece 102 is reliably held via the second jig-insertion holes 161a and 161b arranged in the middle piece 103, at the side closer to the lower piece 102.

According to the aforementioned embodiment, the middle piece 103 includes the partition wall 4 dividing the inside of the surge tank 1 into the two parts, the jig-receiving portion 4a includes the jig-receiving surface 4a including the flat surface surrounding the fluid passage 41 formed at the partition wall 4, and the middle piece 103 and the lower piece 102 are joined to each other in a state where the jig-receiving surface 4a including the flat surface is supported by the jig 201.

According to the above-described configuration, the jig-receiving surface 4a constituted by the flat surface is directly supported by the jig 201. Accordingly, the middle piece 103 and the lower piece 102 can be joined to each other in a state where the portion (the vicinity of the seal portion) of the partition wall 4 which surrounds the fluid passage 41 is reliably held. Consequently, when the middle piece 103 and the lower piece 102 are being joined to each other, the seal portion (the seal surfaces 411a and 412a) which is in the vicinity of the fluid passage 41 and with which the valve body 21 is configured to be in contact is reliably restricted from being deflected.

According to the aforementioned embodiment, the jig-receiving surface 4a is arranged at the outer side relative to the seal surface 411a, 412a configured to be in contact with the seal member 22 of the valve body 21, the seal member 22 is arranged along the edge portion 411, 412 of the fluid passage 41.

According to the above-described configuration, the lower piece 102 can be joined to the middle piece 103 in a state where the jig-receiving surface 4a at the outer side relative to the seal surfaces 411a and 412a of the middle piece 103 is supported by the jig 201 without causing the jig 201 to come into contact with the seal surfaces 411a and 412a. Consequently, after the air intake apparatus body 105 is formed, the seal surfaces 411a and 412a do not include, for example, the dent (the trace or mark of the application of load) caused by the jig 201 and the flatness of the seal surfaces 411a and 412a is maintained. As a result, the sealability of the fluid passage 41 by the valve body 21 is appropriately ensured.

According to the aforementioned embodiment, the manufacturing method of the air intake apparatus 100, includes the step of attaching the valve body 21 to the middle piece 103, the valve body 21 rotating between the open position and the closed position to open and close the fluid passage 41 formed at the partition wall 4 dividing the inside of the surge tank 1 for the V-type 6-cylinder engine 10 into the two parts, the valve body 21 being out of contact with the partition wall 4 at the open position and being in contact with the partition wall 4 at the closed position, the step of forming the air intake apparatus body 105 including the surge tank 1 for the internal combustion engine 10 in a manner that the middle piece 103 to which the valve body 21 is attached and the lower piece 102 (the upper piece 101)

are joined to each other by the vibration welding, and the step of forming the air intake apparatus body 105 including the step of joining the middle piece 103 and the lower piece 102 (the upper piece 101) to each other by the vibration welding in a state where the jig-receiving portions 161 and 4a arranged in the vicinity of the fluid passage 41 of the middle piece 103 are held by the jigs 201 and 202.

According to the above-described method, the air intake apparatus body 105 is formed in a manner that the middle piece 103 and the lower piece 102 (the upper piece 101) are joined to each other by the vibration welding in a state where the jig-receiving portions 161 and 4a that are arranged in the vicinity of the fluid passage 41 of the middle piece 103 are held by the jigs 201 and 202. Accordingly, while the middle piece 103 and the lower piece 102 (the upper piece 101) are being joined to each other by the vibration welding to manufacture the air intake apparatus body 105, the middle piece 103 can be joined to the lower piece 102 (the upper piece 101) in a state where the middle piece 103 is held by the jigs 201 and 202 via the jig-receiving portions 161 and 4a provided in the vicinity of the fluid passage 41 of the partition wall 4. That is, the middle piece 103 and the lower piece 102, and the upper piece 101 are joined to one another to form the surge tank 1 while avoiding the deflection deformation such as the warp and/or twist as much as possible at the portion (the seal portion) of the partition wall 4 in the vicinity of the fluid passage 41. Consequently, after the air intake apparatus body 105 is manufactured, the flatness of the portion of the partition wall 4 (that is, the seal portion) where the valve body 21 rotates is maintained around the fluid passage 41, and therefore the air intake apparatus 100 is obtained in which the appropriate sealing performance or sealability is ensured when the valve body 21 is at the closed position.

In addition, the above-described method includes the step of attaching the valve body 21 to the middle piece 103. The valve body 21 is configured to rotate between the open position at which the valve body 21 is out of contact with the partition wall 4 and the closed position at which the valve body 21 is in contact with the partition wall 4, to open and close the fluid passage 41 formed at the partition wall 4 dividing the inside of the surge tank 1 into the two parts. The above-described method includes the step of forming the air intake apparatus body 105 in a manner that the first member 103 in which the valve body 21 is incorporated and the lower piece 102 are joined to each other by the vibration welding. Accordingly, by rotating the valve body 21, the fluid passage 41 formed at the partition wall 4 is directly blocked or closed. That is, the opening portion formed at the partition wall 4 can be utilized as is, as the fluid passage 41 opened and closed with the valve body 21. Accordingly, the air intake apparatus body 105 can be obtained in which the cross-sectional area of the fluid passage 41 is ensured to be large. Because the cross-sectional area of the fluid passage 41 is increased, the pressure loss of the intake air circulating through the fluid passage 41 is reduced and thus the amount of intake air circulating through the fluid passage 41 is increased accordingly in a case where the valve body 21 rotates to the open position to establish the fluid communication between the two space portions. As a result, the air intake apparatus 100 in which the supercharging effect is enhanced can be obtained.

According to the aforementioned embodiment, the middle piece 103 includes the actuator attach portion 160 to which the actuator 120 rotating the valve body 21 is configured to be attached, and the jig-receiving portion 161 is provided at the actuator attach portion 160. The step of forming the air intake apparatus body 105 includes the step of joining the middle piece 103 and the lower piece 102 (the upper piece 101) to each other by the vibration welding in a state where the jig-receiving portion 161 of the actuator attach portion 160 is held by the jigs 201 and 202.

According to the above-described method, the jig-receiving portion 161 is provided at the portion of the actuator attach portion 160 which is relatively close to the fluid passage 41. As the jig-receiving portion 161 of the actuator attach portion 160 is held by the jigs 201 and 202, the middle piece 103 and the lower piece 102 (the upper piece 101) are joined to each other by the vibration welding in a state where the portion in the vicinity of the fluid passage 41 is easily held. Consequently, the seal portion (the seal surfaces 411a and 412a) which is in the vicinity of the fluid passage 41 and to which the valve body 21 is configured to be in contact is easily restricted from being deflected or deformed while the middle piece 103 and the lower piece 102 (the upper piece 101) are being joined to each other.

According to the aforementioned embodiment, the first member corresponds to the middle piece 103 including the partition wall 4 dividing the inside of the surge tank 1 into the two parts, the second member corresponds to the upper piece 101 arranged at the upper surface side of the partition wall 4 and the lower piece 102 arranged at the lower surface side of the partition wall 4. The step of forming the air intake apparatus body 105 includes the step of joining one of the upper piece 101 and the lower piece 102, and the middle piece 103 to each other by the vibration welding in a state where the jig-receiving portion 161, 4a is held by the jig 201, and thereafter further joining the other of the upper piece 101 and the lower piece 102, and the middle piece 103 to each other by the vibration welding in a state where the middle piece 103 and the one of the upper piece 101 and the lower piece 102 is joined to each other and where the jig-receiving portion 161 is held by the jig 202. The one of the upper piece 101 and the lower piece 102 includes the relatively higher rigidity than the other and the other of the upper piece 101 and the lower piece 102 includes the relatively lower rigidity than the one.

According to the above-described method, the air intake apparatus body 105 can be formed in the following manner. The lower piece 102 including the relatively high rigidity and an appropriate load-bearing performance during the vibration-welding and the middle piece 103 including the partition wall 4 are joined to each other first so that the structural body including the little or small distortion or deformation (that is, the structural body including the accurate design dimension) is formed. Thereafter, the upper piece 101 including the relatively low rigidity is joined to the above-described structural body including the little or small distortion or deformation (that is, the structural body including the accurate design dimension). Consequently, even in a case where the three pieces are joined to one another by the vibration welding, the flatness of the portion of the partition wall 4 (the seal portion, that is, the seal surfaces 411a and 412a) where the valve body 21 rotates is ensured, and the air intake apparatus body 105, of which the design dimension after completion of the manufacture thereof is accurate, is easily obtained.

According to the aforementioned embodiment, the jig-receiving portions include the first jig-insertion holes 161c, 161d, 161e arranged at the side which is closer to the upper piece 101 than to the lower piece 102. The jig 202 is inserted in the first jig-insertion holes 161c, 161d, 161e when the middle piece 103 and the upper piece 101 are being joined to each other. The jig-receiving portions include the jig-receiving surface 4a including the flat surface surrounding the fluid passage 41 formed at the partition wall 4 of the middle piece 103. The jig-receiving portions include the second jig-insertion holes 161a, 161b arranged at the side which is closer to the lower piece 102 than to the upper piece 101. The jig 201 is inserted in the second jig-insertion holes 161a, 161b when the middle piece 103 and the lower piece 102 are being joined to each other. The step of forming the air intake apparatus body 105 includes the step of joining the middle piece 103 and the lower piece 102 to each other by the vibration welding in a state where the jig-receiving surface 4a of the middle piece 103 is held by the jig 201 and where the jig 201 is inserted in the second jig-insertion holes 161a, 161b of the middle piece 103, the jig-receiving surface 4a including the flat surface. The step of forming the air intake apparatus body 105 includes the step of joining the middle piece 103 to which the lower piece 102 is joined and the upper piece 101 to each other by the vibration welding in a state where the jig 202 is inserted in the first jig-insertion holes 161c, 161d, 161e of the middle piece 103. The step of joining the middle piece 103 to which the lower piece 102 is joined and the upper piece 101 to each other is conducted after the step of joining the middle piece 103 and the lower piece 102 to each other by the vibration welding.

According to the above-described method, first, the middle piece 103 is joined to the lower piece 102 including the relatively high rigidity and the appropriate load-bearing performance during the vibration-welding. When the middle piece 103 is being joined to the lower piece 102, the jig 201 is inserted in the second jig-insertion holes 161a and 161b arranged at the middle piece 103 at the side closer to the lower piece 102, and the jig-receiving surface 4a of the middle piece 103 is supported by the jig 201. Thus, the middle piece 103 is being joined to the lower piece 102 in the state where the portion of the jig-receiving portion 161 in the vicinity of the joint portion with the lower piece 102 is reliably held (supported). Accordingly, the structural body including the distortion that is small in extent (that is, the structural body including the accurate design dimension) can be formed. Then, the middle piece 103 to which the lower piece 102 has been joined is joined to the upper piece 101 including the relatively low rigidity. When the middle piece 103 is being joined to the upper piece 101, the jig 202 is inserted into the first jig-insertion holes 161c to 161e which are arranged at the middle piece 103 to be positioned at the side closer to the upper piece 101 and thus the portion of the jig-receiving portion 161 in the vicinity of the joined portion with the upper piece 101 is reliably held. Thus, the occurrence of the distortion or deformation can be prevented or reduced. Consequently, even in a case where the three members, that is, the three pieces, are joined to one another by the vibration welding, the flatness of the portion of the partition wall 4 where the valve body 21 rotates is ensured, and the air intake apparatus body 105, of which the design dimension after completion of the manufacture thereof is accurate, is easily obtained.

The air intake apparatus according to the present disclosure may include a configuration described below.

According to the air intake apparatus 100 described above, the jig-receiving portion 161 includes the jig-insertion holes 161a, 161b, 161c, 161d and 161e serving as the jig-receiving portion. The jig-insertion holes 161a to 161e are extended in the direction which is orthogonal to the joining direction in which the middle piece 103 (the first member), the lower piece 102 (the second member) and the upper piece 101 (the second member) are joined to one another. According to the above-described configuration, when the middle piece 103 and the lower piece 102 (the upper piece 101) are made to face each other and then to be joined to each other in this direction in which the middle piece 103 and the lower piece 102 (the upper piece 101) face each other, the jig 201 (the jig 202) can be inserted into the respective jig-insertion holes 161a to 161e from the lateral side (from the outer side) that is orthogonal to the joining direction. Consequently, the jig-receiving portion 161 of the middle piece 103 is supported easily in a simple manner when the middle piece 103 and the lower piece 102 (the upper piece 101) are being joined to each other.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An air intake apparatus comprising:
an air intake apparatus body including a surge tank for an internal combustion engine;
a valve body rotatably attached to the surge tank and configured to rotate between an open position and a closed position to open and close a fluid passage formed at a partition wall dividing an inside of the surge tank into two parts, the valve body being out of contact with the partition wall at the open position and being in contact with the partition wall at the closed position;
the air intake apparatus body being formed by a first member to which the valve body is attached and a second member joined to the first member; and
the first member including a jig-receiving portion arranged in a vicinity of the fluid passage and configured to receive a jig holding the first member when the first member and the second member are being joined to each other, wherein
the first member includes an actuator attach portion to which an actuator rotating the valve body is configured to be attached,
the jig-receiving portion is provided at the actuator attach portion,
the air intake apparatus body is formed by the first member and the second member joined to each other in a state where the jig-receiving portion of the actuator attach portion is held by the jig,
the actuator attach portion includes a jig-insertion hole serving as the jig-receiving portion,
the first member corresponds to a middle piece including the partition wall dividing the inside of the surge tank into the two parts,
the second member corresponds to an upper piece arranged at an upper surface side of the partition wall and a lower piece arranged at a lower surface side of the partition wall,
the jig-insertion hole includes a first jig-insertion hole into which the jig is inserted when the middle piece and the upper piece are being joined to each other, and a second jig-insertion hole into which the jig is inserted when the middle piece and the lower piece are being joined to each other, and the first jig-insertion hole is arranged at a side which is closer to the upper piece than to the lower piece, and the second jig-insertion hole is arranged at a side which is closer to the lower piece than to the upper piece.

2. The air intake apparatus according to claim 1, wherein the first member includes the partition wall dividing the inside of the surge tank into the two parts, the jig-receiving portion includes a jig-receiving surface including a flat surface surrounding the fluid passage formed at the partition wall, and the first member and the second member are joined to each other in a state where the jig-receiving surface including the flat surface is supported by the jig.

3. The air intake apparatus according to claim 2, wherein the jig-receiving surface is arranged at an outer side relative to a seal surface configured to be in contact with a seal member of the valve body, the seal member is arranged along an edge portion of the fluid passage.

4. A manufacturing method of an air intake apparatus, comprising:

a step of attaching a valve body to a first member, the valve body rotating between an open position and a closed position to open and close a fluid passage formed at a partition wall dividing an inside of a surge tank for an internal combustion engine into two parts, the valve body being out of contact with the partition wall at the open position and being in contact with the partition wall at the closed position;

a step of forming an air intake apparatus body including the surge tank for the internal combustion engine in a manner that the first member to which the valve body is attached and a second member are joined to each other by vibration welding; and the step of forming the air intake apparatus body including a step of joining the first member and the second member to each other by the vibration welding in a state where a jig-receiving portion arranged in a vicinity of the fluid passage of the first member is held by a jig, wherein the first member includes an actuator attach portion to which an actuator rotating the valve body is configured to be attached, the jig-receiving portion is provided at the actuator attach portion, the step of forming the air intake apparatus body includes a step of joining the first member and the second member to each other by the vibration welding in a state where the jig-receiving portion of the actuator attach portion is held by the jig, the first member corresponds to a middle piece including the partition wall dividing the inside of the surge tank into the two parts, the second member corresponds to an upper piece arranged at an upper surface side of the partition wall and a lower piece arranged at a lower surface side of the partition wall, and the step of forming the air intake apparatus body includes a step of joining one of the upper piece and the lower piece, and the middle piece to each other by the vibration welding in a state where the jig-receiving portion is held by the jig, and thereafter further joining the other of the upper piece and the lower piece, and the middle piece to each other by the vibration welding in a state where the middle piece and the one of the upper piece and the lower piece is joined to each other and where the jig-receiving portion is held by the jig, the one of the upper piece and the lower piece including a relatively higher rigidity than the other and the other of the upper piece and the lower piece including a relatively lower rigidity than the one.

5. The manufacturing method of the air intake apparatus according to claim 4, wherein the jig-receiving portion includes:

a first jig-insertion hole arranged at a side which is closer to the upper piece than to the lower piece, the jig is inserted in the first jig-insertion hole when the middle piece and the upper piece are being joined to each other, a jig-receiving surface including a flat surface surrounding the fluid passage formed at the partition wall of the middle piece, a second jig-insertion hole arranged at a side which is closer to the lower piece than to the upper piece, the jig is inserted in the second jig-insertion hole when the middle piece and the lower piece are being joined to each other, and the step of forming the air intake apparatus body includes:

a step of joining the middle piece and the lower piece to each other by the vibration welding in a state where the jig-receiving surface of the middle piece is held by the jig and where the jig is inserted in the second jig-insertion hole of the middle piece, the jig-receiving surface including the flat surface, and a step of joining the middle piece to which the lower piece is joined and the upper piece to each other by the vibration welding in a state where the jig is inserted in the first jig-insertion hole of the middle piece, the step of joining the middle piece to which the lower piece is joined and the upper piece to each other being conducted after the step of joining the middle piece and the lower piece to each other by the vibration welding.

* * * * *